United States Patent [19]
Zakharian

[11] Patent Number: 6,078,110
[45] Date of Patent: Jun. 20, 2000

[54] METHOD OF OBTAINING THE ADJUSTABLE CAPACITOR

[75] Inventor: Manvel Zakharian, Laval, Canada

[73] Assignee: Manvel Zakharian, Canada

[21] Appl. No.: 09/042,395

[22] Filed: Mar. 12, 1998

[51] Int. Cl.[7] .................................................. H02M 5/08
[52] U.S. Cl. .......................... 307/109; 307/110; 323/352; 361/321.1; 257/595
[58] Field of Search .................................... 307/109, 110; 323/352; 361/272, 321.7; 320/166; 258/312; 318/362; 257/595; 438/379

[56] References Cited

U.S. PATENT DOCUMENTS

| | | | |
|---|---|---|---|
| 3,562,637 | 2/1971 | Gikow | 323/352 |
| 3,569,795 | 3/1971 | Gikow | 361/321.1 |
| 3,702,405 | 11/1972 | Zwirn et al. | 307/109 |
| 4,516,041 | 5/1985 | Quan | 330/279 |
| 5,568,035 | 10/1996 | Kato et al. | 307/110 |

*Primary Examiner*—Albert W. Paladini
*Attorney, Agent, or Firm*—Albert W. Paladini

[57] ABSTRACT

The method of obtaining the adjustable capacitor permits transforming all types of capacitors (including Electrolytic, Vacuum, Gas, high-voltage capacitors) into adjustable capacitors without moving parts inside capacitors and provides broad ranges of changing the capacity of adjustable capacitors in electric circuits of direct and alternating current and in all types of Marx Generators. The method comprising the steps of: choosing at least two capacitors or two groups of capacitors with the same capacities; sustaining absolute values of potential differences on said first and second capacitors or on said first and second groups of capacitors equal to each other; changing the capacity of the adjustable capacitor by using a voltage divider or a voltage source and/or a phase-shifting device; connecting second plates of said first and second capacitors or said first and second groups of capacitors through at least one adjustable inductive reactance device and/or at least one adjustable reactor; and the condition for choosing optimum values of inductances of the adjustable inductive reactance device or the adjustable reactor. The present invention can be used in pulse technology, in Power-Factor-Correction and Filtering Equipment and in equipment with a resonance method.

43 Claims, 22 Drawing Sheets

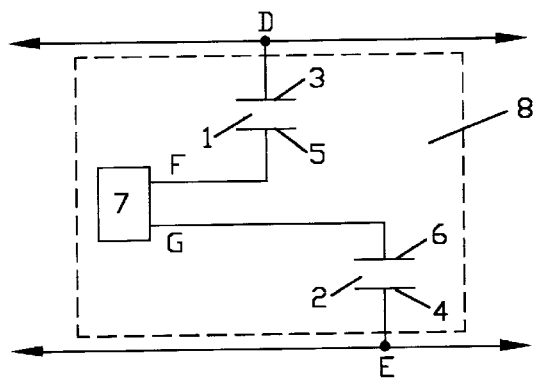
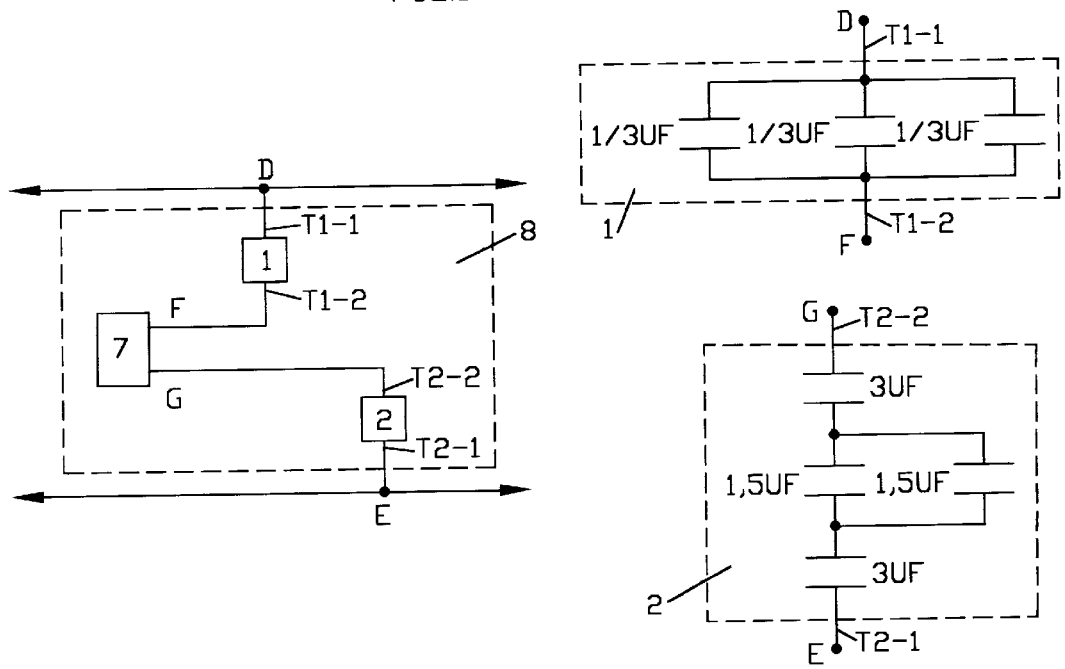
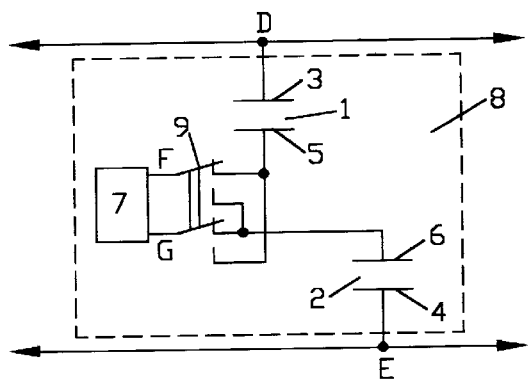
FIG.1
FIG.2
FIG.3 a)

b)

c)

d)

a)

b)

c)

METHOD OF OBTAINING THE ADJUSTABLE CAPACITOR

BACKGROUND OF THE INVENTION

The present invention relates to the methods of obtaining the adjustable capacitor for low-voltage and high-voltage.

Known mechanical method of obtaining an adjustable capacitor uses the step of changing the distance between capacitor plates or the step of changing the active area of capacitor plates.

This method has the following shortcomings:

It is difficult to make this capacitor hermetic;

The capacitor can change its electrical characteristics because it is not hermetic and in consequence of friction between moving parts;

It is not expedient to use a mechanical method for capacitors with a big capacity, for high voltage capacitors, for Power-Factor-Correction Capacitors, for Vacuum Capacitors and for Gas Capacitors;

It is not possible to use a mechanical method for changing capacities of Electrolytic Capacitors which plates are realized as spirals;

The peak of energy density is not high;

The maximum rate of changing a capacity of a capacitor cannot be high.

U.S. Pat. No. 3,569,795, Cl.317/231 of Gikow is an example of well known voltage variable capacitors of alternating current in which a capacity of a capacitor is changed as a result of the effect of changing a dielectric constant of a ferroelectric material by direct current control voltage. The capacitors of this type can not decrease a capacity of the capacitor to zero by said control voltage and have relatively narrow range of changing a capacity and the used principle of changing a capacity cannot transform other types of capacitors into variable capacitors.

Gikow, in U.S. Pat. No. 3,562,637, Cl.323/74, uses direct current control voltage, applied to each capacitor from a plurality of capacitors (at least four capacitors), for obtaining the adjustable capacitor of alternating current. The control voltage creates on each of the pairs of said capacitors, connected together in series, voltages which have opposite directions and counteract each other. In this technical solution all energy of charging of said serially connected capacitors can not be discharged and the energy, which can not be discharged, is approximately proportional to $(CU_C)^2$ where $U_C$ is the control voltage, C is the capacitance of one of said capacitors. The mentioned short comings decrease the range of changing the capacity and do not permit obtaining an adjustable Power-Factor-Correction Capacitor, an adjustable capacitor for an electric circuit which actuates a resonance, an adjustable capacitor whose capacity can be decreased to zero. Said plurality of capacitors can not provide a rapid extraction of the stored energy into a load because voltages on each of the pairs of said capacitors have opposite directions and the electric charges on each of two connected together plates of said capacitors are the same: positive or negative. For obtaining th e adjustable capacitors according to both Gikow U.S. Pat. Nos. 3,562,637 and 3,569,795, it is necessary to use a source of control voltage of direct current with resistors and to recuperate relatively high energy losses on said resistors.

A conception which permits transforming all types of invariable capacitors into variable capacitors does not exist in the art and an adjustable Electrolytic Capacitor and an adjustable Power-Factor-Correction Capacitor, with stepless control of capacity, do not exist on the market.

SUMMARY OF THE INVENTION

The present invention permits transforming all types of invariable capacitors into variable by two ways and each of said ways uses a control voltage of the same type that the voltage of an operating electric circuit or a network and changes the capacity of the adjustable capacitor by changing a value of said control voltage or by changing a value of said part of voltage of said operating electric circuit or network and/or by changing a value of said full voltage of said operating electric circuit or network or by changing a phase-shift φ between said control voltage and the voltage of said operating electric circuit or network or by changing a phase-shift φ between said part of voltage of said operating electric circuit or network and the voltage of said operating electric circuit or network or by changing the direction of said control voltage or by changing the direction of said part of voltage of the operating electric circuit or the network or by changing the direction of said full voltage of said operating electric circuit or network.

The first way provides an adjustable capacity by the steps of: choosing a voltage source whose terminals of opposite polarities are equally insulated with regard to the ground; connecting said operating electric circuit or network through first plates of a first and a second capacitors, which have equal capacitances, or through a first output terminals of a first and a second groups of capacitors, which have equal capacitances and each has two output terminals; applying a part of voltage of said operating electric circuit or network or a full voltage of said operating electric circuit or network to second plates of said first and second capacitors or to second output terminals of said first and second groups of capacitors or applying a control voltage to second plates of said first and second capacitors or to second output terminals of said first and second groups of capacitors by said voltage source; then changing the capacity of the adjustable capacitor by one of mentioned above steps of changing the capacity.

The second way provides an adjustable capacity by the steps of: connecting said operating electric circuit or network through serially connected first and third capacitors or through serially connected first and third groups of capacitors having two output terminals, each; applying a part of voltage of said operating electric circuit or network or a full voltage of said operating electric circuit or network to the plates of said third capacitor or to first and second output terminals of said third group of capacitors or applying a control voltage to the plates of said third capacitor or to first and second output terminals of said third group of capacitors by a voltage source; then changing the capacity of the adjustable capacitor by one of mentioned above steps of changing the capacity.

The both ways provide a rapid extraction of the stored energy into a load by the step of connecting electrically plates of at least one of capacitors or by the step of connecting electrically output terminals of at least one of groups of capacitors within discharging of said capacitors.

The objects, advantages and many other novel features of the present invention are apparent from the following detailed description when read in conjunction with the appended claims and attached drawings.

BRIEF DESCRIPTION OF THE DRAWINGS

FIG. 1 illustrates the adjustable capacitor 8, with a voltage source 7, obtained on the base of a first 1 and a second 2 capacitors.

FIG. 2 illustrates the adjustable capacitor 8, with the voltage source 7, obtained on the base of a first 1 and a second 2 groups of capacitors.

FIG. 3 illustrates the adjustable capacitor 8, obtained on the base of the first 1 and the second 2 capacitors, which permits changing the capacity of the adjustable capacitor by changing the direction of the control voltage.

DETAILED DESCRIPTION OF THE INVENTION

Figure 4:
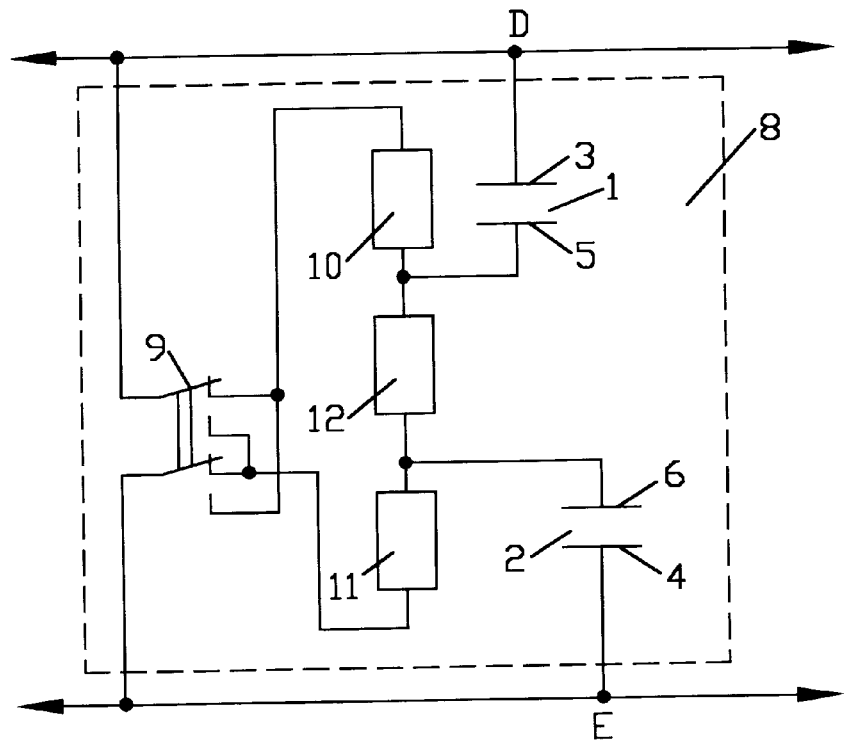
FIG. 4 illustrates the adjustable capacitor 8, obtained on the base of the first 1 and the second 2 capacitors and a voltage divider having a first 10, a second 11 and a third 12 arms.
Figure 5:
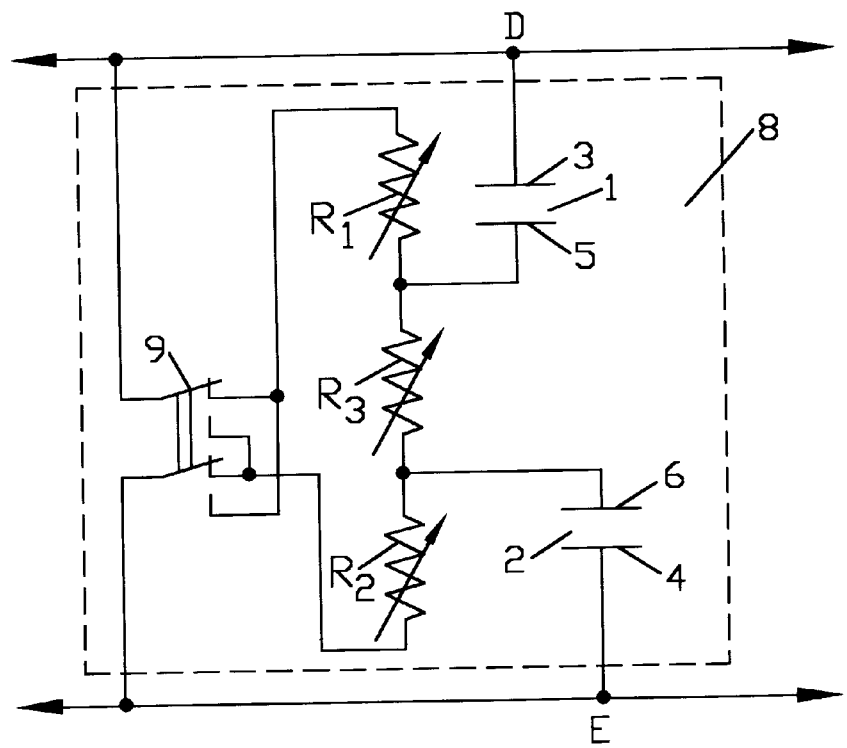
FIG. 5 illustrates the adjustable capacitor 8, obtained on the base of the first 1 and the second 2 capacitors and a resistor voltage divider.
Figure 6:
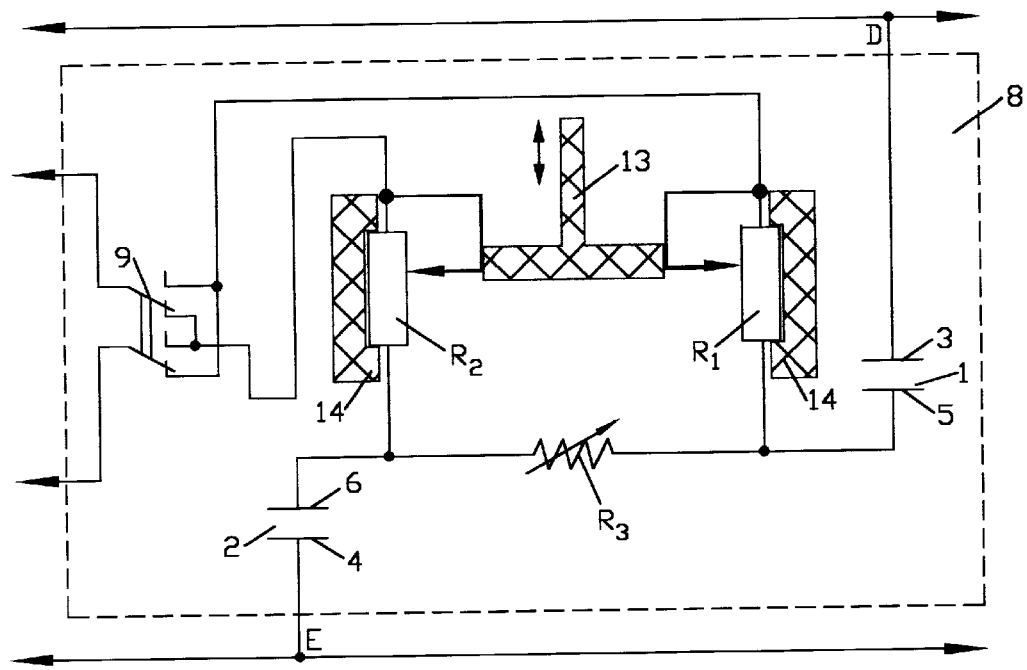
FIG. 6 illustrates one embodiment of the adjustable capacitor 8 with the resistor voltage divider, which permits changing a first $R_1$ and a second $R_2$ adjustable resistances of said resistor voltage divider simultaneously and equally.
Figure 7:
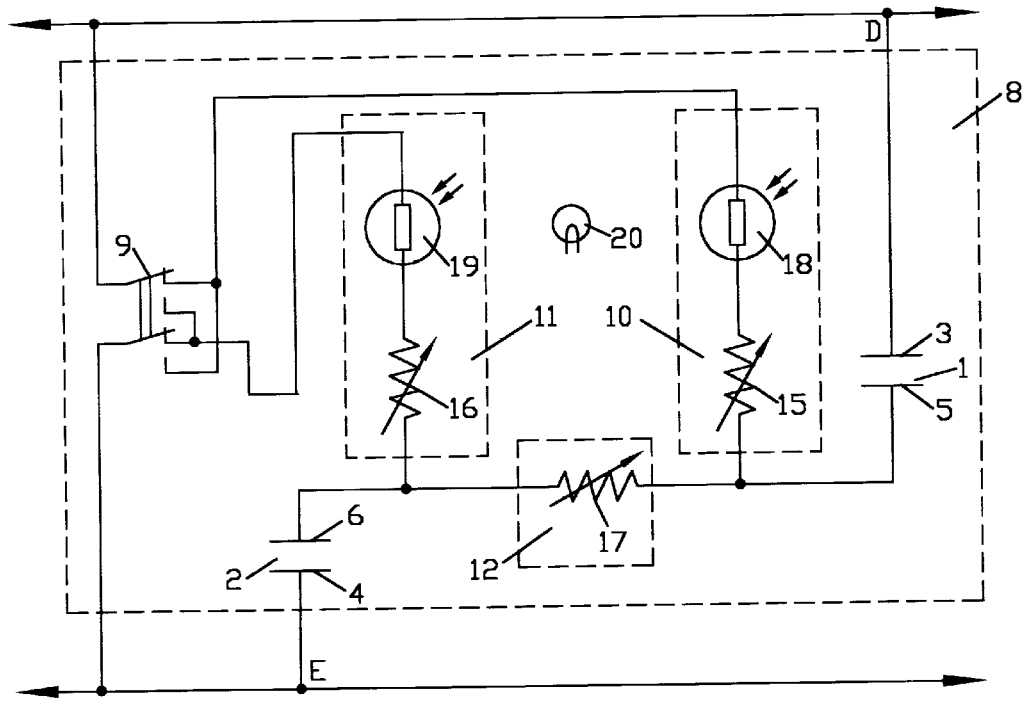
FIG. 7 illustrates one embodiment of the adjustable capacitor 8 with a voltage divider having a first 10, a second 11 and a third 12 branches.
Figure 8:
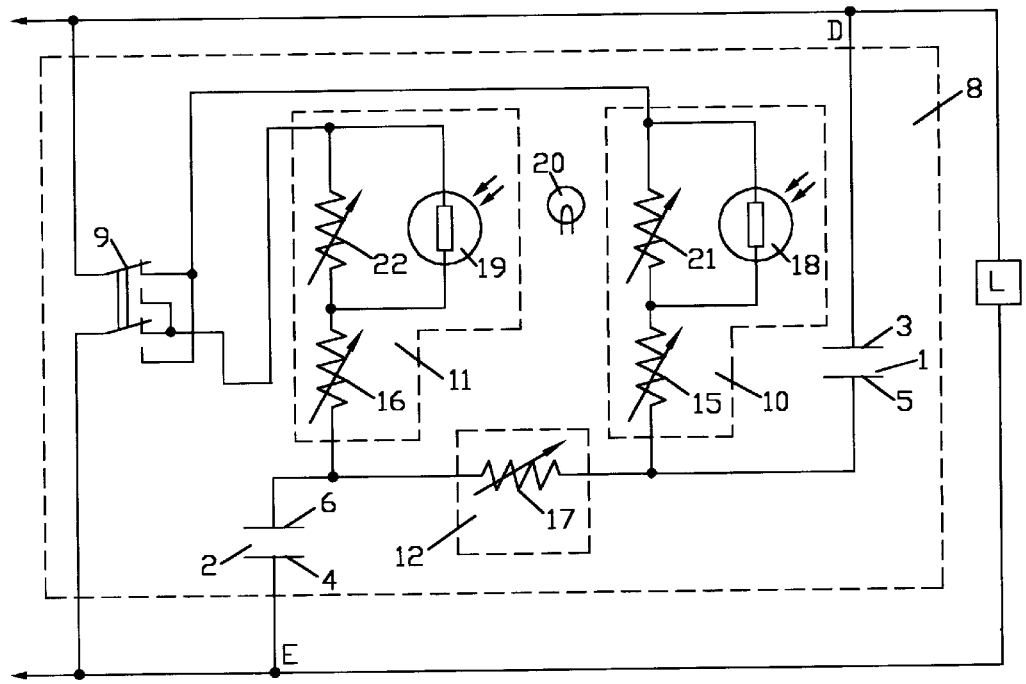
FIG. 8 illustrates one embodiment of the adjustable capacitor 8 with a voltage divider having arms which can change their resistances and/or states.
Figure 9:
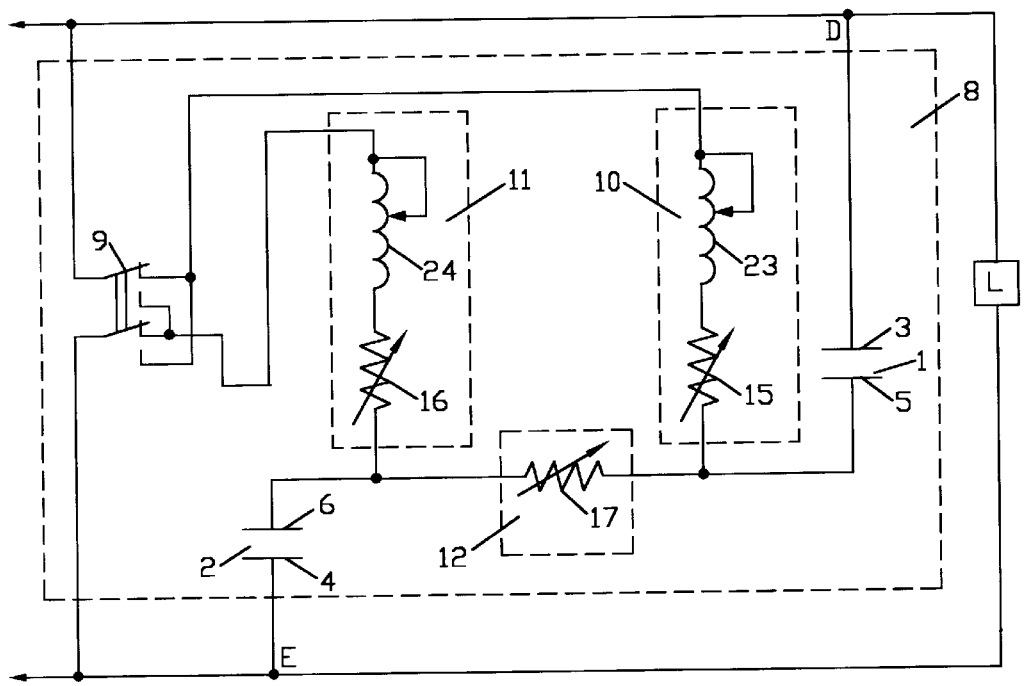
FIG. 9 illustrates an alternative embodiment of the adjustable capacitor 8 with the voltage divider having a first 10, a second 11 and a third 12 branches.
Figure 10:
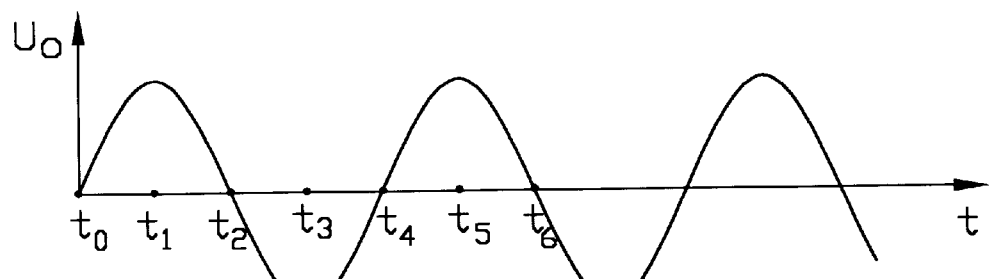
FIG. 10a illustrates an example of the voltage $U_0$ of the operating electric circuit or network, applied to first plates of the first 1 and the second 2 capacitors or to first output terminals of the first 1 and the second 2 groups of capacitors.
FIG. 10b, FIG. 10c and FIG. 10d illustrate the examples of control voltages $U_A$.
Figure 10:
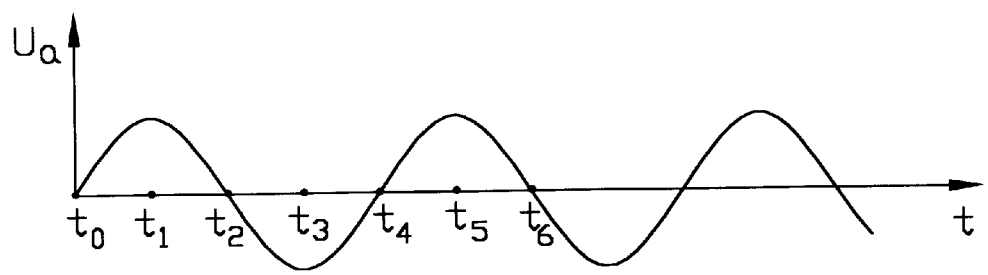
Figure 10:
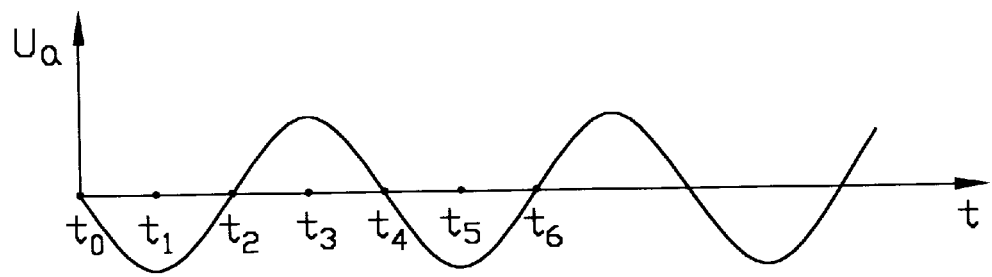
Figure 10:
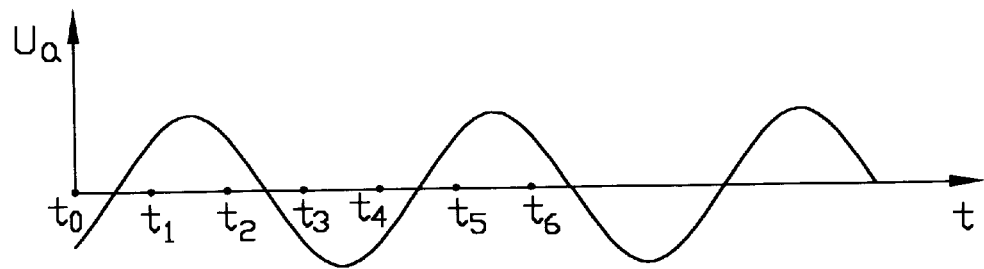
Figure 11:
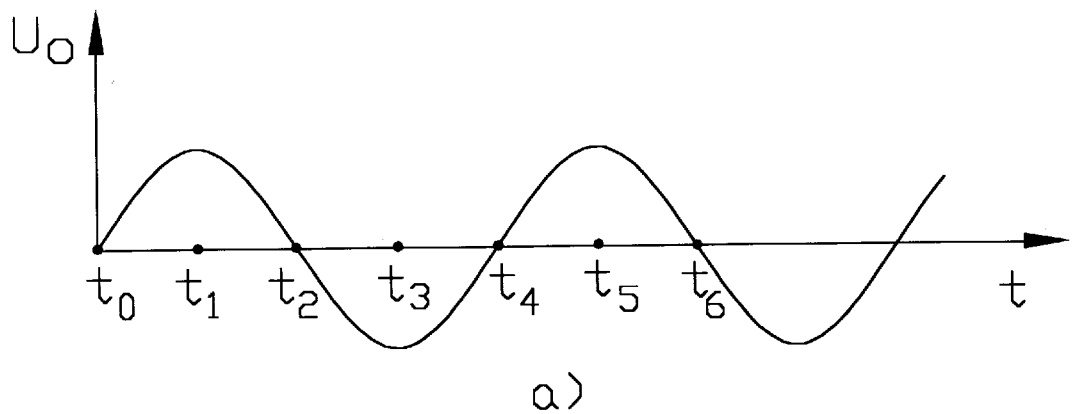
FIG. 11a illustrates an example of the voltage $U_0$ of said operating electric circuit or network.
FIG. 11b and FIG. 11c illustrate the examples when values of the control voltages $U_A$ are more than the value of the voltage $U_0$ of said operating electric circuit or network.
Figure 11:
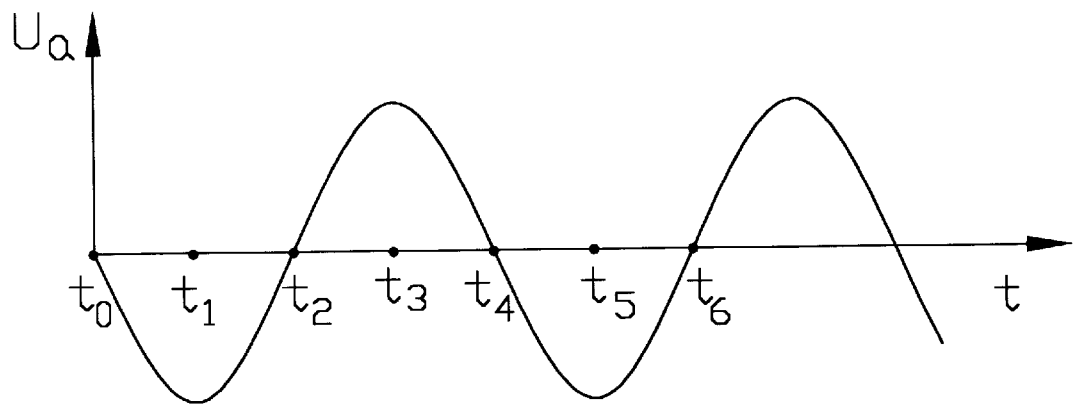
Figure 11:
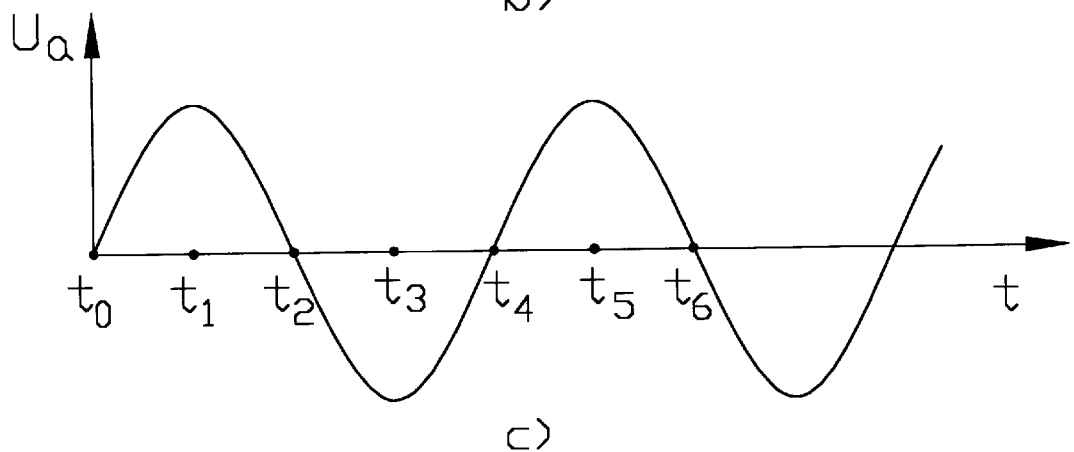
Figure 12:
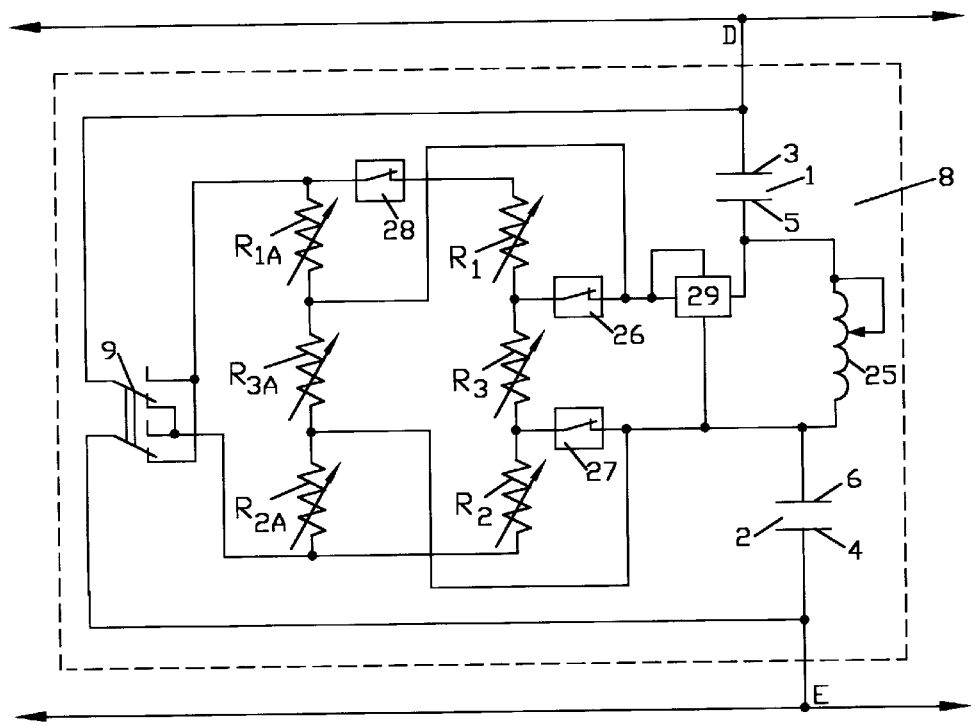
FIG. 12 illustrates one embodiment of the adjustable capacitor 8 including the step of connecting second plates of the first 1 and the second 2 capacitors through an inductive reactance device 25.
Figure 13:
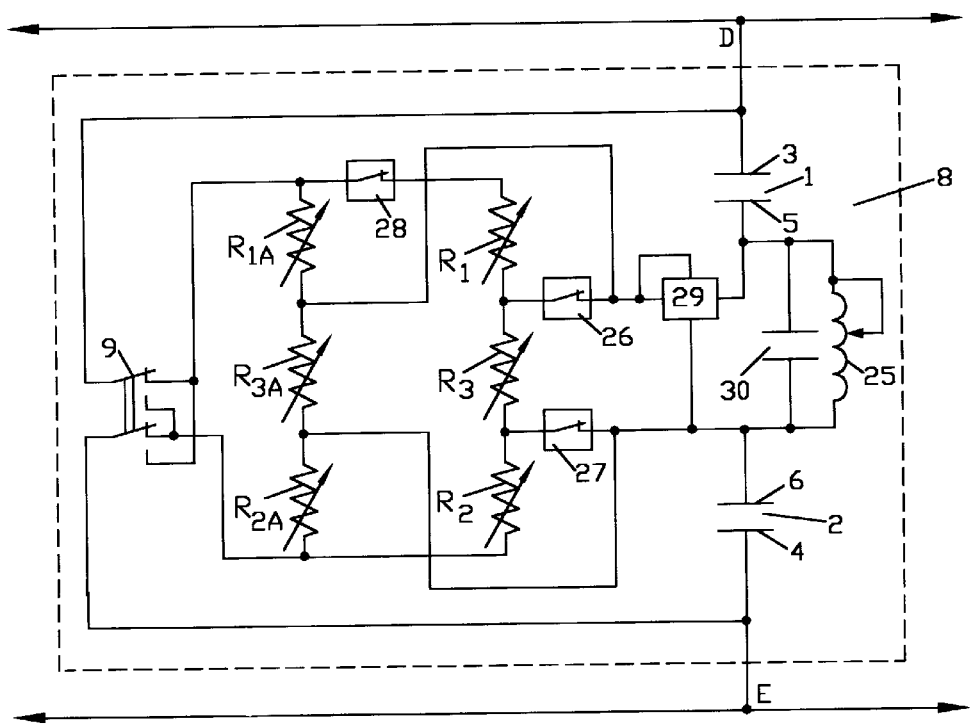
FIG. 13 illustrates one embodiment of the adjustable capacitor 8 including the step of connecting second plates of the first 1 and the second 2 capacitors through an inductive reactance device 25 and through a third capacitor 30.
Figure 14:
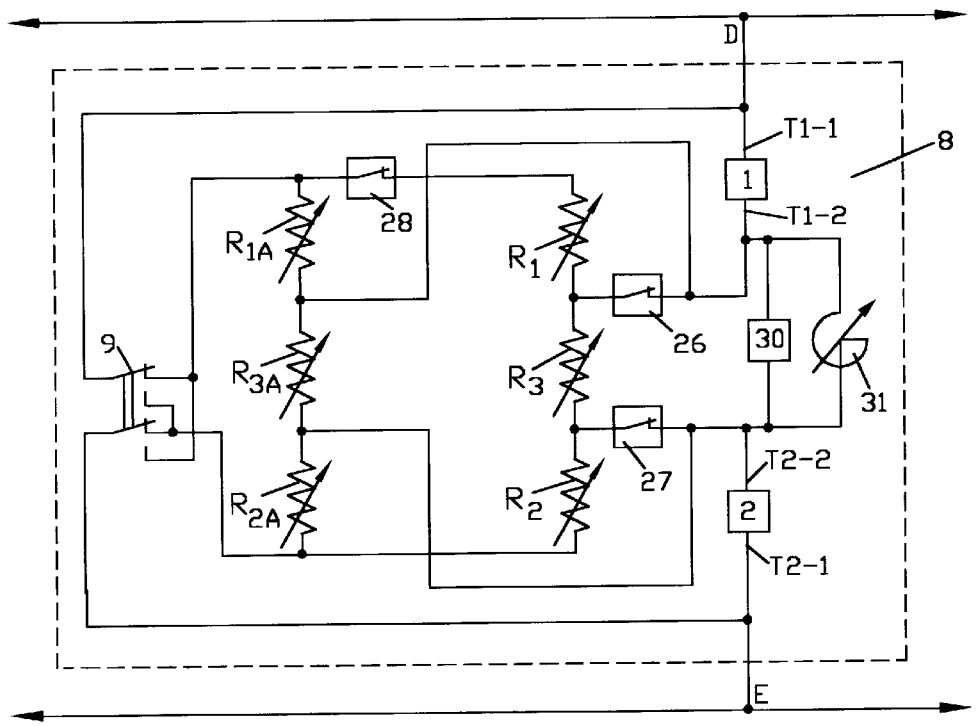
FIG. 14 illustrates one embodiment of the adjustable capacitor 8 including the step of connecting second output terminals of the first 1 and the second 2 groups of capacitors through a reactor 31 and through a third group of capacitors 30.
Figure 15:
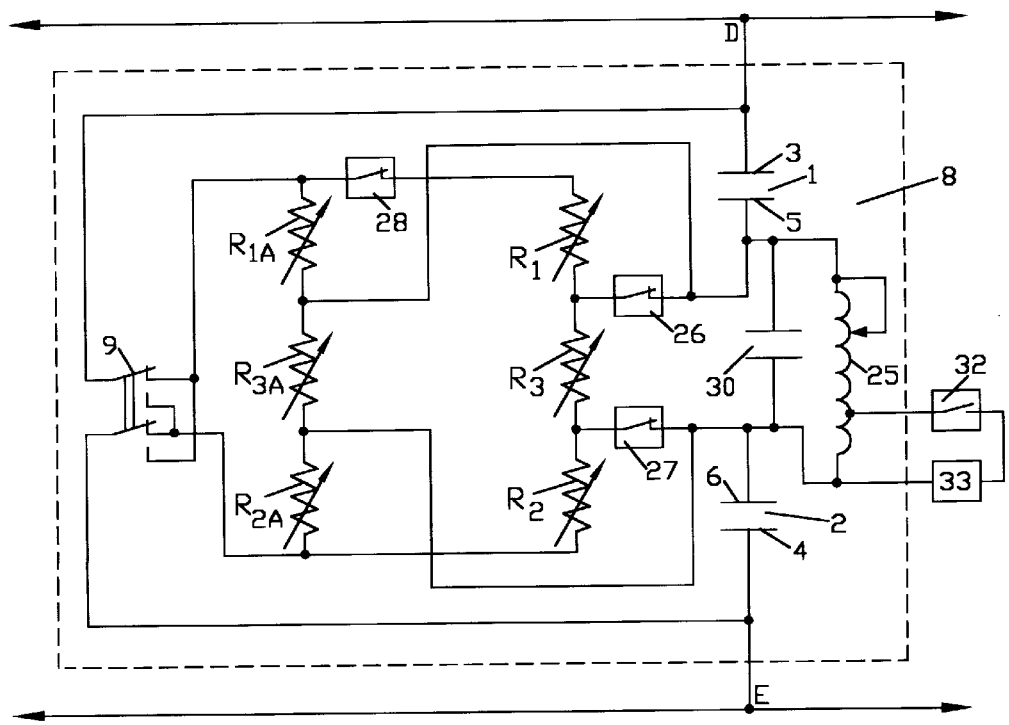
FIG. 15 illustrates one embodiment of the adjustable capacitor 8 which permits changing the capacity of the adjustable capacitor by transmitting a part of energy of said capacitors and/or the inductive reactance 25 in a supplementary electric circuit 33.
Figure 16:
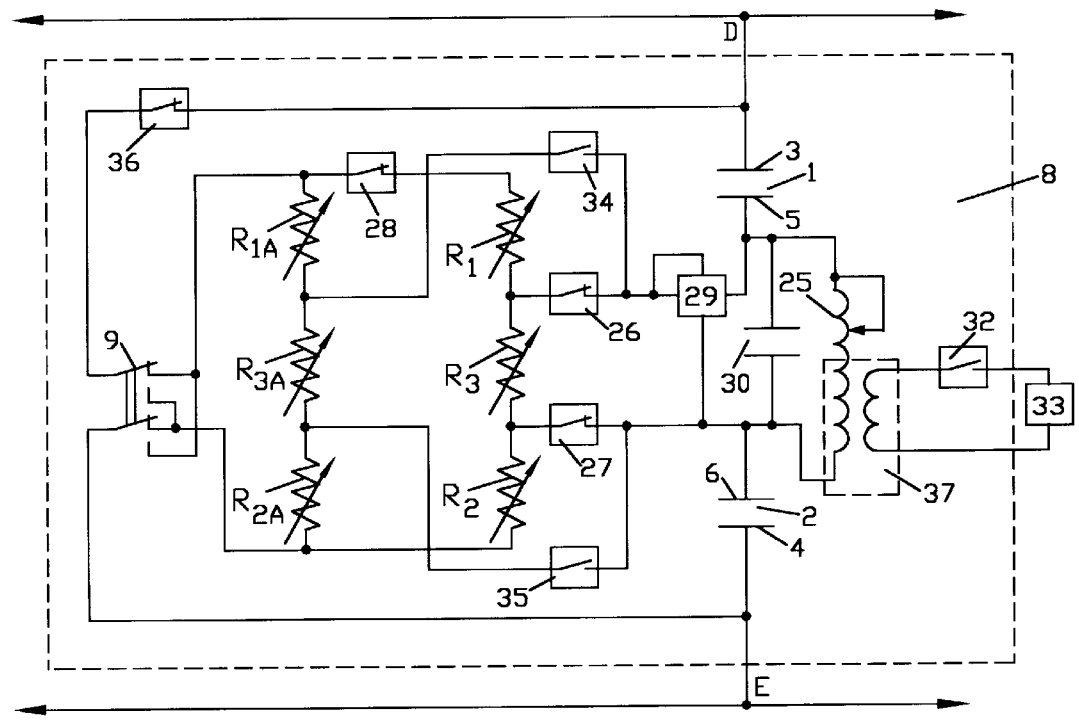
FIG. 16 illustrates one embodiment of the adjustable capacitor 8 in which a part of the inductive reactance device 25 is realized as a transformer 37.
Figure 17:
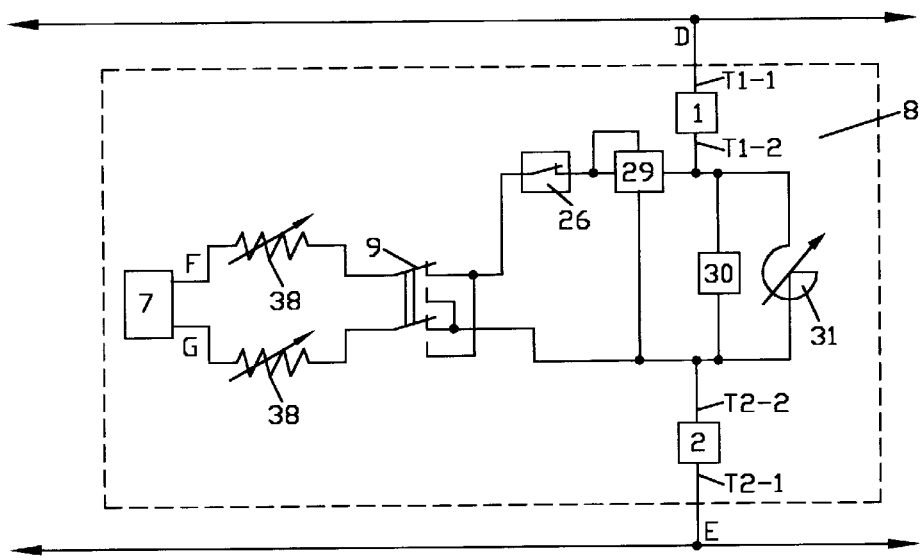
FIG. 17 illustrates one embodiment of the adjustable capacitor 8 with an adjustable reactor 31 and a device 29 for measuring, registering the total power S and its active P and reactive Q components.
Figure 18:
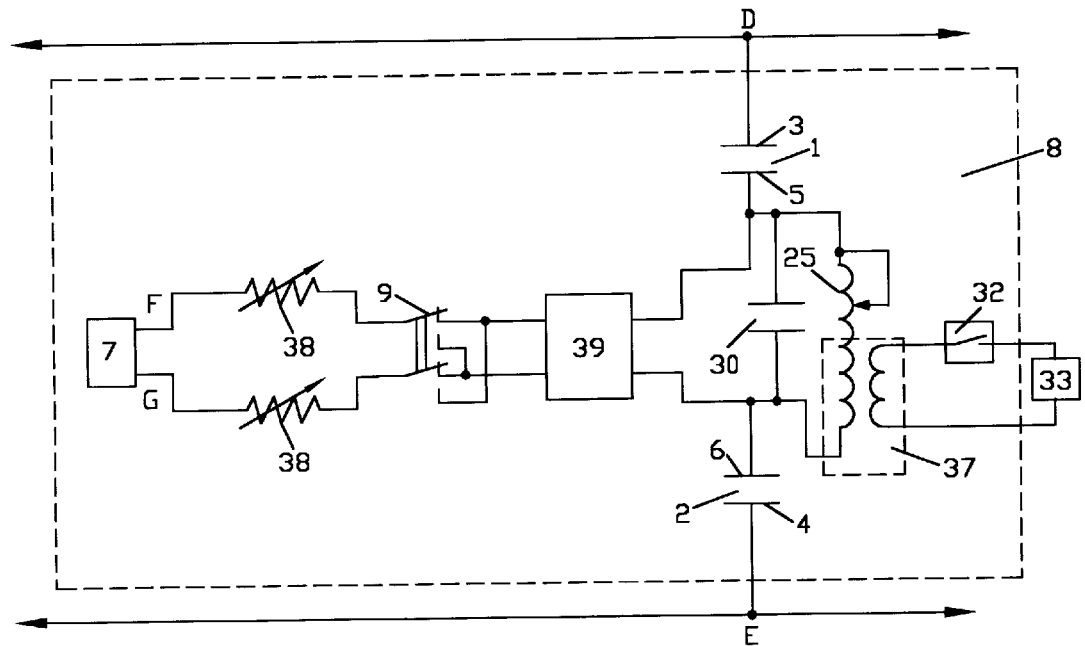
FIG. 18 illustrates one embodiment of the adjustable capacitor 8, with a phase-shift device 39, which permit changing the capacity of the adjustable capacitor 8 by changing a phase-shift (p between said control voltage and the voltage of said operating electric circuit or network. This embodiment also permits changing the capacity of the adjustable capacitor by transforming a part of energy of said capacitors and/or said inductive reactance 25 in a supplementary electric circuit 33.
Figure 19:
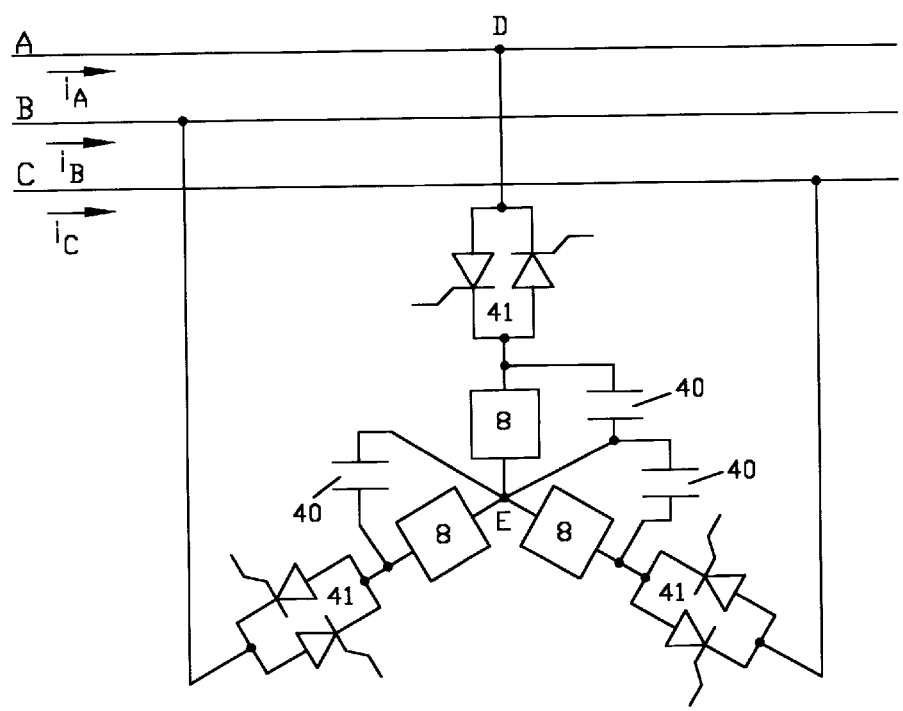
FIG. 19 illustrates one embodiment in which the adjustable capacitor 8 in star connection with said operating electric circuit or network.
Figure 20:
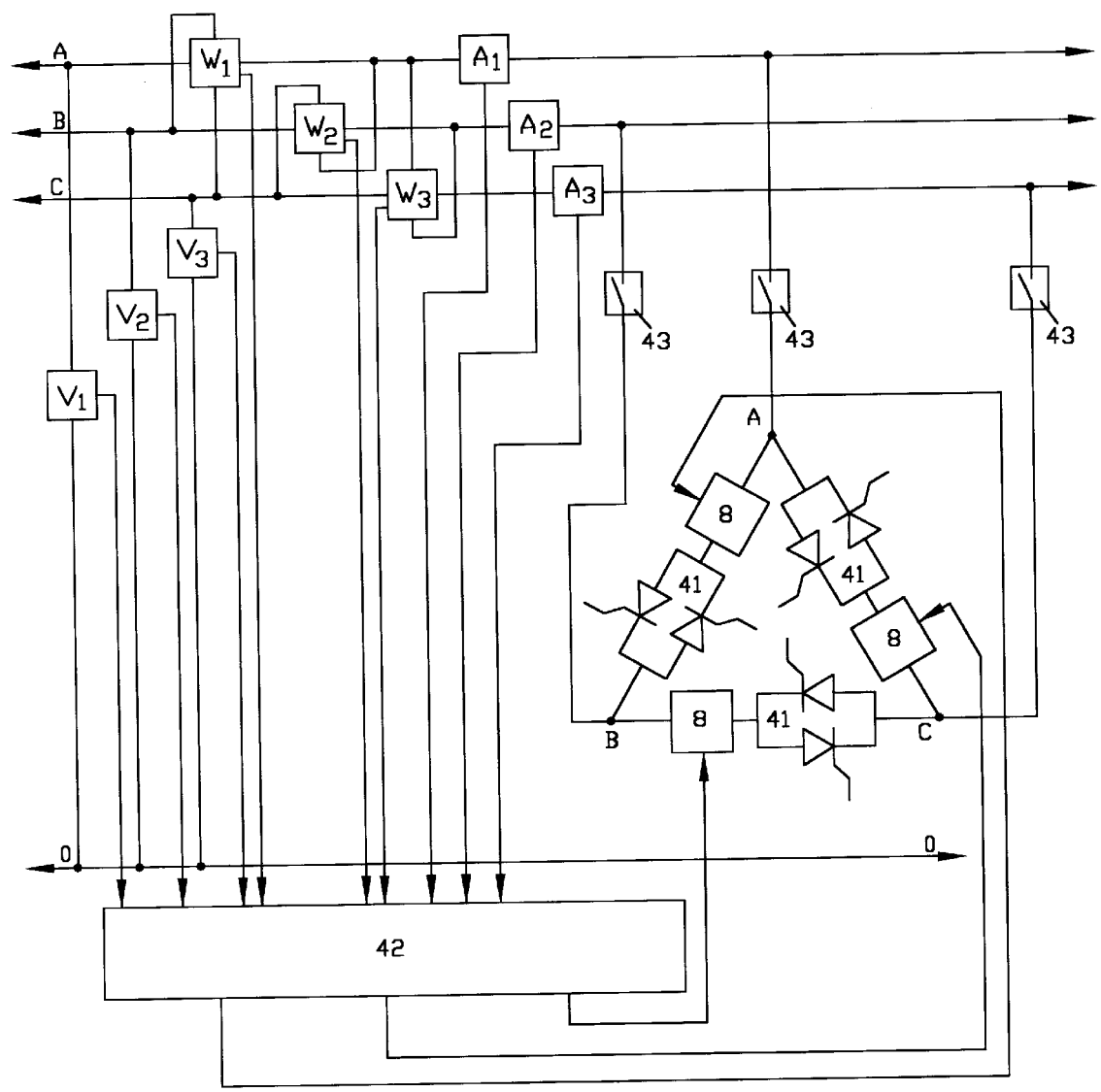
FIG. 20 illustrates one embodiment in which the adjustable capacitor 8 in delta connection with said operating electric circuit or network. This embodiment also illustrates the step of measuring a current, a power, a voltage of said operating electric circuit or network.
Figure 21:
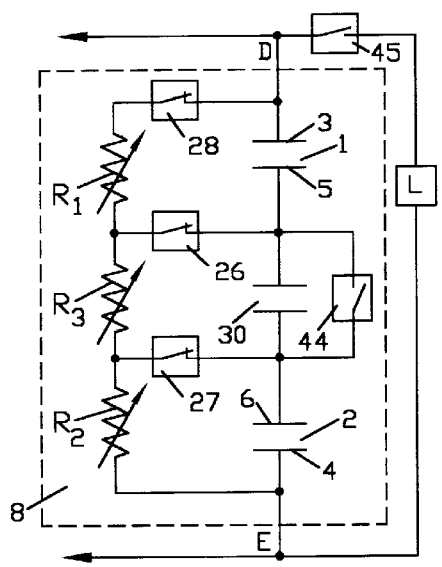
FIG. 21 illustrates one embodiment of the adjustable capacitor 8 with a third capacitor 30.
Figure 22:
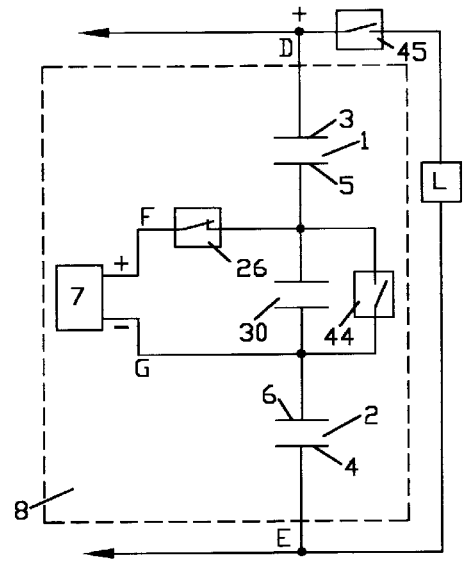
FIG. 22 illustrates one embodiment of the adjustable capacitor 8, with a voltage source 7, which provides full discharging of the first 1 and the second 2 capacitors. This technical solution also permits applying a voltage to the third capacitor 30 within charging of said capacitors.
Figure 23:
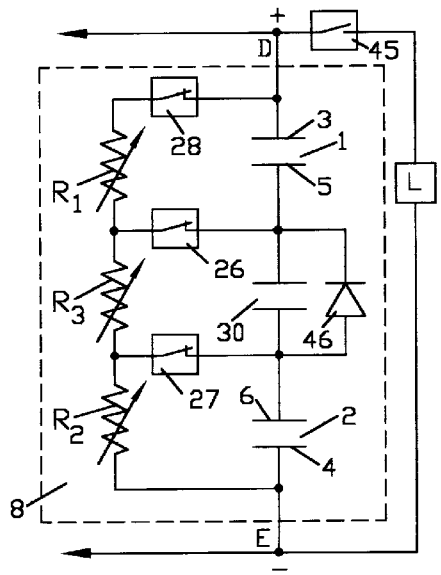
FIG. 23 illustrates one embodiment of the adjustable capacitor 8 in which the step of connecting electrically plates of the third capacitor is realized through a diode 46. This technical solution also permits applying a voltage to said third capacitor within charging of said capacitors.
Figure 24:
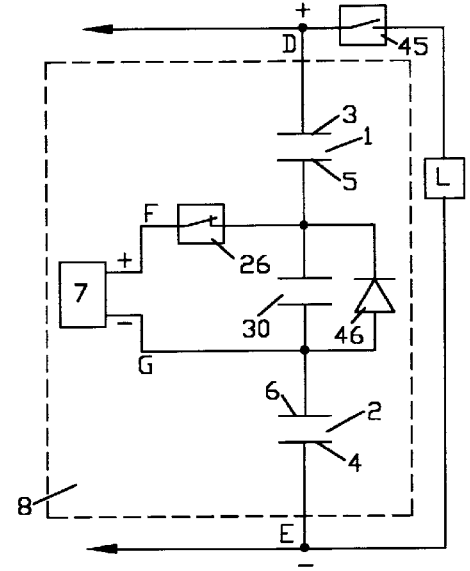
FIG. 24 illustrates an alternative embodiment of the adjustable capacitor 8, with the voltage source 7, in which the step of connecting electrically plates of the third capacitor is realized through a diode 46.
Figure 25:
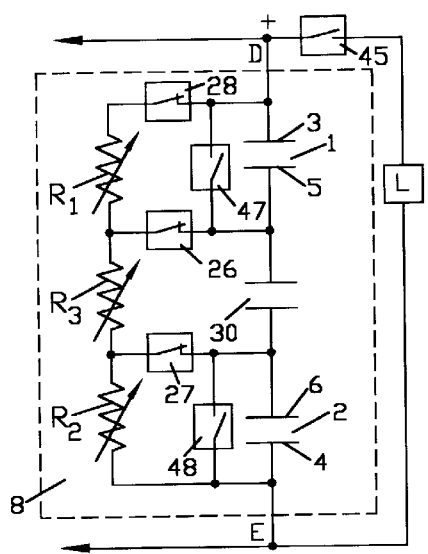
FIG. 25 illustrates one embodiment of the adjustable capacitor 8 which provides full discharging of the third capacitor 30.
Figure 26:
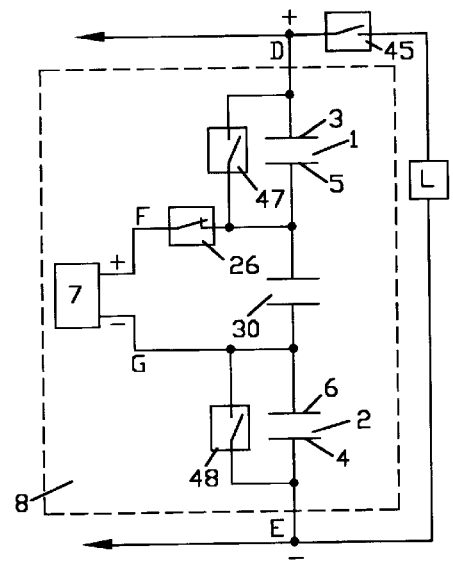
FIG. 26 illustrates an alternative embodiment of the adjustable capacitor 8, with the voltage source 7, which provides full discharging of the third capacitor 30.
Figure 27:
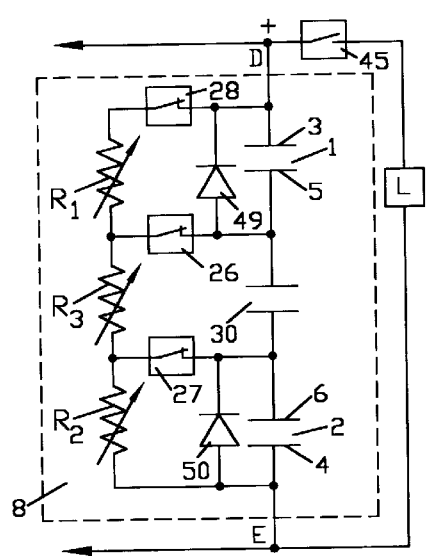
FIG. 27 illustrates one embodiment of the adjustable capacitor 8 in which the step of connecting electrically plates of the first capacitor 1 and plates of the second capacitor 2 is realized through two additional diodes 49 and 50.
Figure 28:
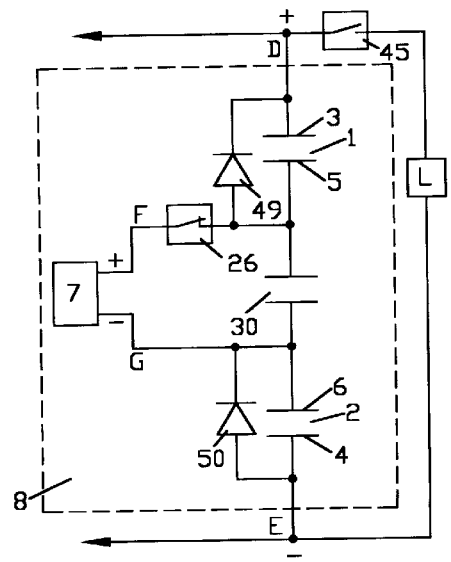
FIG. 28 illustrates an alternative embodiment of the adjustable capacitor 8, in which the step of connecting electrically plates of the first capacitor 1 and plates of the second capacitor 2 is realized through two additional diodes 49 and 50.
Figure 29:
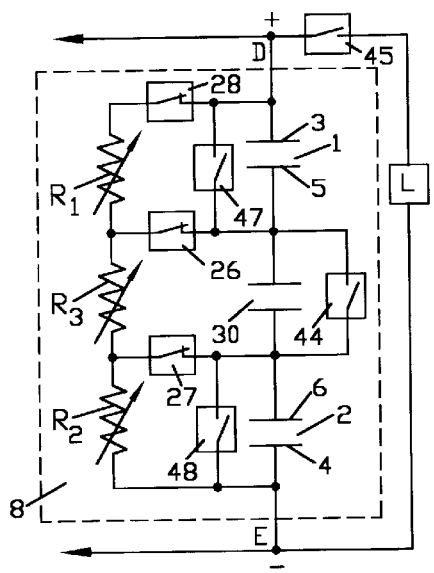
FIG. 29 illustrates one embodiment of the adjustable capacitor 8 which provides full discharging of the adjustable capacitor 8.
Figure 30:
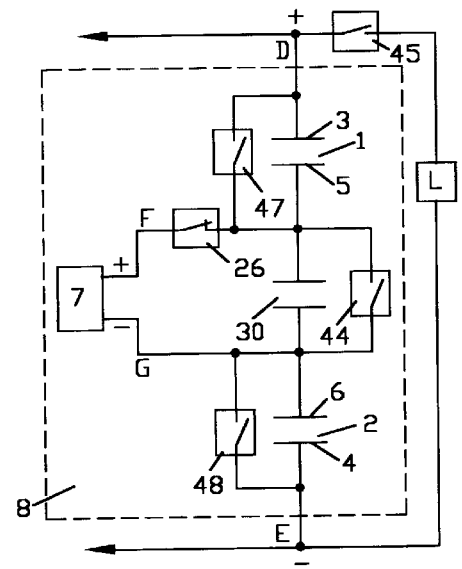
FIG. 30 illustrates an alternative embodiment of the adjustable capacitor 8, with the voltage source 7, which provides full discharging of the adjustable capacitor 8.
Figure 31:
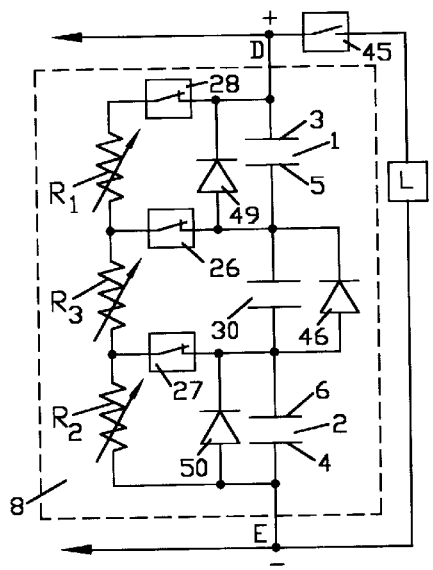
FIG. 31 illustrates one embodiment of the adjustable capacitor 8 in which diodes 46, 49 and 50 provide full discharging of the adjustable capacitor 8.
Figure 32:
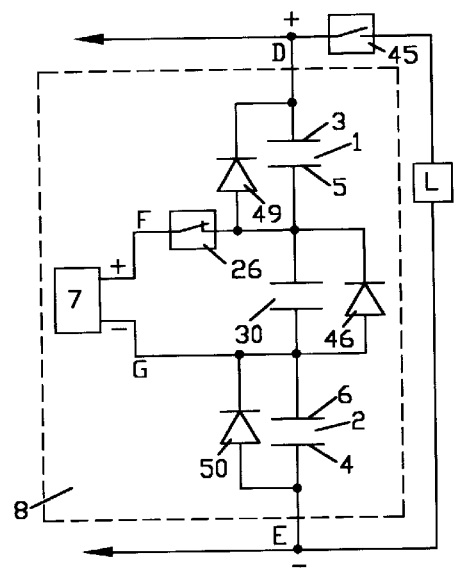
FIG. 32 illustrates an alternative embodiment of the adjustable capacitor 8, with the voltage source 7, in which diodes 46, 49 and 50 provide full discharging of the adjustable capacitor 8.
Figure 33:
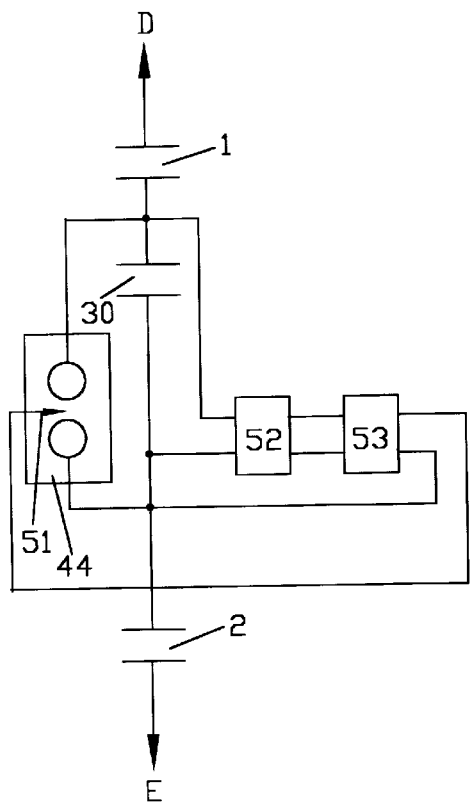
FIG. 33 illustrates a device for realizing the step of connecting electrically plates of the third capacitor 30 within discharging of the first 1 and the second 2 capacitors.
Figure 34:
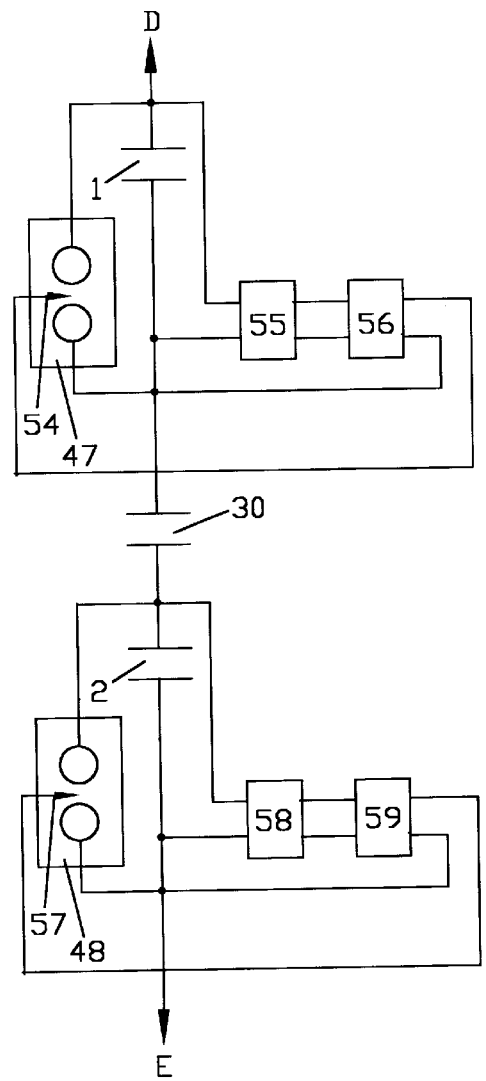
FIG. 34 illustrates a device for realizing the step of connecting electrically plates of the first 1 and the second 2 capacitors within discharging of said third capacitor 30.
Figure 35:
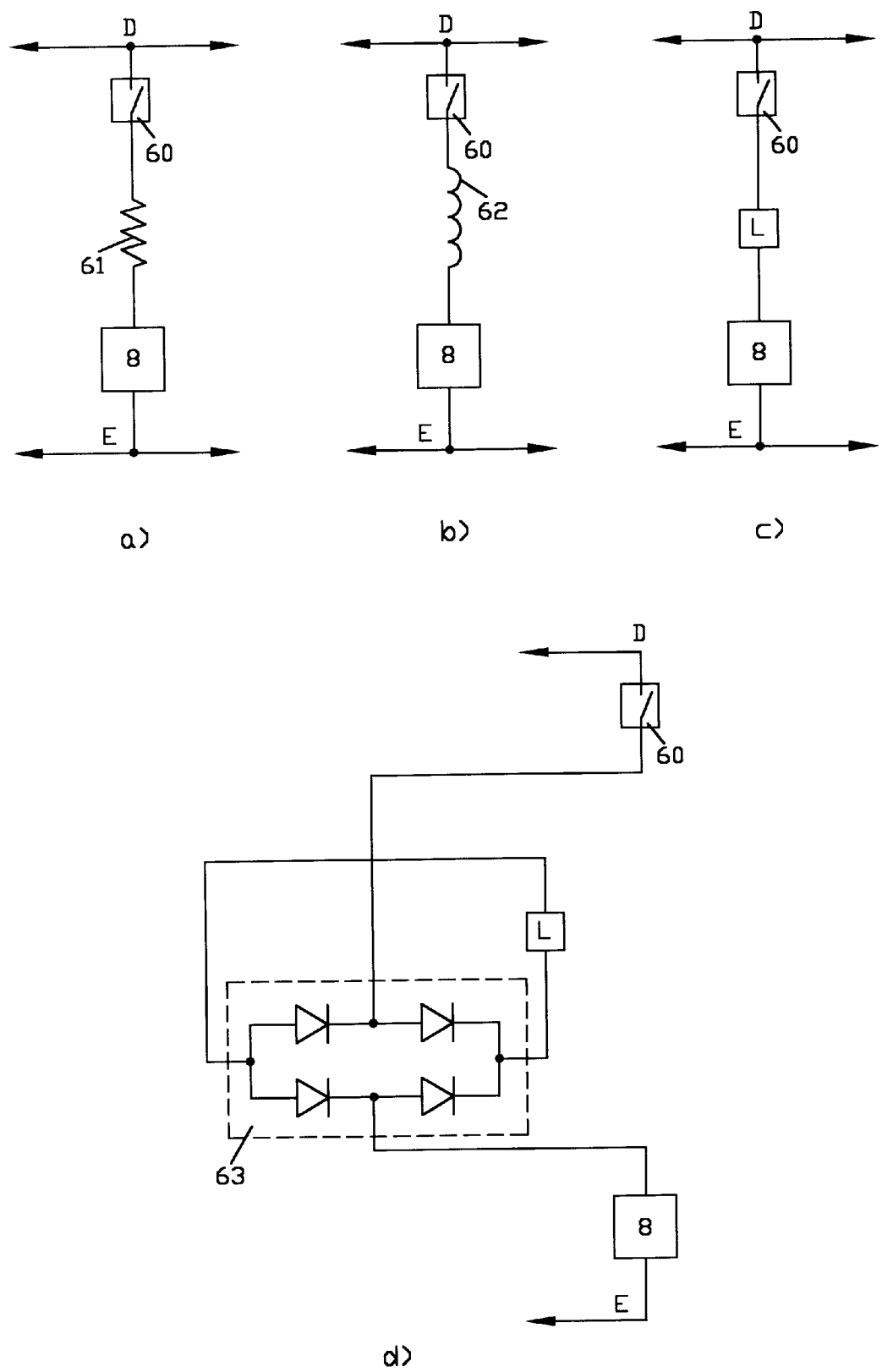
FIG. 35 illustrates that the adjustable capacitor 8 can be connected to an operating electric circuit or a network through different devices (a switching device 60, a resistance 61, an inductive reactance 62, a load L and a bridge rectifier 63 with a load L) which do not affect the principle of functioning of the adjustable capacitor 8 but permit increasing the functional potentialities of the adjustable capacitor 8 or increasing reliability of uninterrupted operation of said operating electric circuit or network.

The invention is hereinafter described with reference to the accompanying drawing in which:

FIG. 1 includes the first 1 and the second 2 capacitors, whose capacities are chosen equal to each other, and the voltage source 7 whose terminals F and G of opposite polarities are equally insulated with regard to the ground and whose created voltage on said terminals F and G is a voltage of the same type that the voltage of an operating electric circuit or a network (D and E are the points of said operating electric circuit or network). FIG. 1 explains the steps of: connecting said operating electric circuit or network through the first plates 3 and 4 of said first 1 and second 2 capacitors; applying a control voltage to second plates 5 and 6 of said first 1 and second 2 capacitors by said voltage source 7. This embodiment permits changing the capacity of the adjustable capacitor 8 by changing a value of said control voltage, created by the voltage source 7, FIG. 2 includes the first group of capacitors 1, with the first T1-1 and the second T1-2 output terminals, the second group of capacitors 2, with the first T2-1 and the second T2-2 output terminals, whose capacities are chosen equal to each other, and the voltage source 7 whose terminals F and G of opposite polarities are equally insulated with regard to the ground and whose created voltage on said terminals F and G is a voltage of the same type that the voltage of an operating electric circuit or a network (D and E are the points of said operating electric circuit or network). FIG. 2 explains the steps of: connecting said operating electric circuit or network through said first output terminals T1-1 and T2-1 of said first 1 and second 2 groups of capacitors; applying a control voltage to second output terminals of said first and second groups of capacitors by said voltage source 7. This embodiment permits changing the capacity of the adjustable capacitor 8 by changing a value of said control voltage, created by the voltage source 7;

FIG. 3 includes the first 1 and the second 2 capacitors, whose capacities are chosen equal to each other, and the voltage source 7 whose terminals F and G of opposite polarities are equally insulated with regard to the ground and whose created voltage on said terminals F and G is a voltage of the same type that the voltage of an operating electric circuit or a network (D and E are the points of said operating electric circuit or network). FIG. 3 explains the steps of: connecting said operating electric circuit or network through the first plates 3 and 4 of said first 1 and second 2 capacitors; applying a control voltage to second plates 5 and 6 of said first 1 and second 2 capacitors by said voltage source 7. This embodiment permits changing the capacity of the adjustable capacitor 8 by changing a value of said control voltage, created by the voltage source 7, or by changing the direction of said control voltage. A two-way switch 9 of the adjustable capacitor 8 ensures changing the direction of said control voltage. The two-way switch 9 can be mechanical or electronic or photo(optical)-electronic;

FIG. 4 includes the first 1 and the second 2 capacitors, whose capacities are chosen equal to each other. FIG. 4 explains the steps of: connecting said operating electric circuit or network (D and E are the points of said operating electric circuit or network) through the first plates 3 and 4 of said first 1 and second 2 capacitors; applying a part of voltage of said operating electric circuit or network or a full voltage of said operating electric circuit or network to second plates 5 and 6 of said first 1 and second 2 capacitors. This embodiment permits changing the capacity of the adjustable capacitor 8 by changing a value of said part of voltage of said operating electric circuit or network or a value of said full voltage of said operating electric circuit or network. This embodiment also permits changing the capacity of the adjustable capacitor 8 by changing the direction of said part of voltage of the operating electric circuit or network or by changing the direction of said full voltage of said operating electric circuit or network. The two-way switch 9 of the adjustable capacitor 8 ensures changing the direction of said voltages. The step of applying a part of voltage of said operating electric circuit or network or a full voltage of said operating electric circuit or network to second plates 5 and 6 of said first 1 and second 2 capacitors is realized by a voltage divider having a first 10, a second 11 arms, equal to each other, which can change their reactances or resistances or states, and including a third arm 12, which can change its reactance or resistance or state. A value of said part of voltage of said operating electric circuit or network or a value of said full voltage of said operating electric circuit or network can be changed by the step of changing reactances or resistances or states of said first 10 and second 11 arms equally or by the step of changing reactance or resistance or state of said third arm 12;

FIG. 5 includes the first 1 and the second 2 capacitors, whose capacities are chosen equal to each other. FIG. 5 explains the steps of: connecting said operating electric circuit or network (D and E are the points of said operating electric circuit or network) through the first plates 3 and 4 of said first 1 and second 2 capacitors; applying a part of voltage of said operating electric circuit or network or a full voltage of said operating electric circuit or network to second plates 5 and 6 of said first 1 and second 2 capacitors. This embodiment permits changing the capacity of the adjustable capacitor 8 by changing a value of said part of voltage of said operating electric circuit or network or a value of said full voltage of said operating electric circuit or network. This embodiment also permits changing the capacity of the adjustable capacitor 8 by changing the direction of said part of voltage of the operating electric circuit or network or by changing the direction of said full voltage of said operating electric circuit or network. The two-way switch 9 of the adjustable capacitor 8 ensures changing the direction of said voltages. The step of applying a part of voltage of said operating electric circuit or network or a full voltage of said operating electric circuit or network to second plates 5 and 6 of said first 1 and second 2 capacitors is realized by the steps of: choosing a first $R_1$ and a second $R_2$ adjustable resistances equal to each other; connecting first and second terminals of a third $R_3$ adjustable resistance to second terminals of said first $R_1$ and second $R_2$ adjustable resistances respectively; connecting different potentials of said operating electric circuit or network through first terminals of said first $R_1$ and second $R_2$ adjustable resistances; connecting second plates 5 and 6 of said first and second capacitors through said first and second terminals of said third resistance $R_3$ respectively. This embodiment permits changing the capacity of the adjustable capacitor 8 by changing said first $R_1$ and second $R_2$ resistances equally or by changing said third $R_3$ resistance;

FIG. 6 includes: the first 1 and the second 2 capacitors, whose capacities are chosen equal to each other; a resistance voltage divider having the first $R_1$ and the second $R_2$ adjustable resistances, equal to each other, and the third adjustable resistance $R_3$; the two-way switch 9; a slide 13 and fastenings 14 which are installed for changing said first $R_1$ and second $R_2$ resistances simultaneously and equally. This embodiment permits changing the capacity of the adjustable capacitor 8 by changing said first $R_1$ and second $R_2$ resistances simultaneously and equally or by changing said third $R_3$ resistance. The two-way switch 9 of the adjustable capacitor 8 ensures changing the direction of a voltage applied to second plates 5 and 6 of said first 1 and second 2 capacitors;

FIG. 7 includes: the first 1 and the second 2 capacitors, whose capacities are chosen equal to each other; a first branch 10 with an adjustable resistance 15 and a photo-electric device 18; a second branch 11 with an adjustable resistance 16 and a photo-electric device 19; a third branch with an adjustable resistance 17; a light source 20 optically connected to photo-electric devices 18 and 19. Photoconductive cells or photorelays can be used, for example, as the photo-electric devices 18 and 19. FIG. 7 explains the steps of: connecting said operating electric circuit or network (D and E are the points of said operating electric circuit or network) through the first plates 3 and 4 of said first 1 and second 2 capacitors; applying a part of voltage of said operating electric circuit or network or a full voltage of said operating electric circuit or network to second plates 5 and 6 of said first 1 and second 2 capacitors. This embodiment permits changing the capacity of the adjustable capacitor 8 by changing a value of said part of voltage of said operating electric circuit or network or a value of said full voltage of said operating electric circuit or network. This embodiment also permits changing the capacity of the adjustable capacitor 8 by changing the direction of said part of voltage of the operating electric circuit or network or by changing the direction of said full voltage of said operating electric circuit or network. The two-way switch 9 of the adjustable capacitor 8 ensures changing the direction of said voltages. The step of applying a part of voltage of said operating electric circuit or network or a full voltage of said operating electric circuit or network to second plates 5 and 6 of said first 1 and second 2 capacitors is realized by the steps of: choosing the adjustable resistance 15 and the photo-electric device 18 of said first branch 10 equal to the adjustable resistance 16 and the photo-electric device 19 of said second branch 11 respectively; connecting first and second terminals of said third branch 12 to second terminals of said first 10 and second 11 branches respectively; connecting different potentials of said operating electric circuit or network through first terminals of said first 10 and second 11 branches; connecting second plates 5 and 6 of said first 1 and second 2 capacitors through said first and second terminals of said third branch 12 respectively. This embodiment permits changing the capacity of the adjustable capacitor 8 by changing the adjustable resistances 15 and 16 equally or by changing the adjustable resistance 17 or by changing the states of said photo-electric devices 18 and 19;

FIG. 8 includes: the first 1 and the second 2 capacitors, whose capacities are chosen equal to each other; a voltage divider having a first arm 10, with adjustable resistances 15, 21 and a photo-electric device 18, a second arm 11, with adjustable resistances 16, 22 and a photo-electric device 19, and a third arm 12 with an adjustable resistance 17; a light source 20 optically connected to photo-electric devices 18 and 19; and a load L. FIG. 8 explains the steps of: connecting said operating electric circuit or network (D and E are the points of said operating electric circuit or network) through the first plates 3 and 4 of said first 1 and second 2 capacitors; applying a part of voltage of said operating electric circuit or network or a full voltage of said operating electric circuit or network to second plates 5 and 6 of said first 1 and second 2 capacitors. This embodiment permits changing the capacity of the adjustable capacitor 8 by changing a value of said part of voltage of said operating electric circuit or network or a value of said full voltage of said operating electric circuit or network. This embodiment also permits changing the capacity of the adjustable capacitor 8 by changing the direction of said part of voltage of the operating electric circuit or network or by changing the direction of said full voltage of said operating electric circuit or network. The two-way switch 9 of the adjustable capacitor 8 ensures changing the direction of said voltages. The step of applying a part of voltage of said operating electric circuit or network or a full voltage of said operating electric circuit or network to second plates 5 and 6 of said first 1 and second 2 capacitors is realized by the steps of: choosing the adjustable resistances 15, 21 and the photo-electric device 18 of said first arm 10 equal to the adjustable resistances 16, 22 and the photo-electric device 19 of said second arm 11 respectively; connecting first and second terminals of said third arm 12 to second terminals of said first 10 and second 11 arms respectively; connecting different potentials of said operating electric circuit or network through first terminals of said first 10 and second 11 arms; connecting second plates 5 and 6 of said first 1 and second 2 capacitors through said first and second terminals of said third arm 12 respectively. This embodiment permits changing the capacity of the adjustable capacitor 8 by changing the adjustable resistances 15 and 16 or the adjustable resistances 21 and 22 equally or by changing the adjustable resistance 17 or by changing the states of said photo-electric devices 18 and 19;

FIG. 9 includes: the first 1 and the second 2 capacitors, whose capacities are chosen equal to each other; a first branch 10 with an adjustable resistance 15 and an adjustable inductive reactance 23; a second branch 11 with an adjustable resistance 16 and an adjustable inductive reactance 24; a third branch 12 with an adjustable resistance 17; a load L. FIG. 9 explains the steps of: connecting said operating electric circuit or network (D and E are the points of said operating electric circuit or network) through the first plates 3 and 4 of said first 1 and second 2 capacitors; applying a part of voltage of said operating electric circuit or network or a full voltage of said operating electric circuit or network to second plates 5 and 6 of said first 1 and second 2 capacitors. This embodiment permits changing the capacity of the adjustable capacitor 8 by changing a value of said part of voltage of said operating electric circuit or network or a value of said full voltage of said operating electric circuit or network. This embodiment also permits changing the capacity of the adjustable capacitor 8 by changing the direction of said part of voltage of the operating electric circuit or network or by changing the direction of said full voltage of said operating electric circuit or network. The two-way switch 9 of the adjustable capacitor 8 ensures changing the direction of said voltages. The step of applying a part of voltage of said operating electric circuit or network or a full voltage of said operating electric circuit or network to second plates 5 and 6 of said first 1 and second 2 capacitors is realized by the steps of: choosing the adjustable resistance 15 and the adjustable inductive reactance 23 of said first branch 10 equal to the adjustable resistance 16 and the adjustable inductive reactance 24 of said second branch 11 respectively; connecting first and second terminals of said third branch 12 to second terminals of said first 10 and second 11 branches respectively; connecting different potentials of said operating electric circuit or network through first terminals of said first 10 and second 11 branches; connecting second plates 5 and 6 of said first 1 and second 2 capacitors through said first and second terminals of said third branch 12 respectively. This embodiment permits changing the capacity of the adjustable capacitor 8 by changing the adjustable resistances 15 and 16 or the adjustable inductive reactances 23 and 24 equally or by changing the adjustable resistance 17;

FIG. 10 explains the step of choosing said control voltage $U_a$ (FIG. 10b) with the phase-shift between it and the voltage of said operating electric circuit or network $U_0$ (FIG. 10a) equal to zero and the step of choosing said control voltage Ua (FIG. 10c) with the phase-shift between it and the voltage of said operating electric circuit or network $U_o$ (FIG. 10a) equal to 180°;

FIG. 10a, FIG. 10d and FIG. 18 (described below) explain the step of changing the capacity of the adjustable capacitor by changing a phase-shift between said control voltage $U_a$ (FIG. 10d) and the voltage of said operating electric circuit or network $U_0$ (FIG. 10a);

FIG. 11 explains the step of choosing the maximum value of said control voltage $U_a$ (FIG. 11b and FIG. 11c) more than the maximum voltage of said operating electric circuit or network $U_o$ (FIG. 11a);

FIG. 12 explains the step of connecting said second plates 5 and 6 of said first 1 and second 2 capacitors through an inductive reactance device 25 which can be adjustable. FIG. 12 includes: the first 1 and the second 2 capacitors, whose capacities are chosen equal to each other; a first resistance voltage divider with adjustable resistances $R_1$, $R_2$ and $R_3$; a second resistance voltage divider with additional adjustable resistances $R_{1A}$, $R_{2A}$ and $R_{3A}$; the two-way switch 9; switching devices 26, 27 and 28; a device 29 for measuring the total power S and its active P and reactive Q components. The adjustable capacitor 8 also can function without said second resistance voltage divider;

FIG. 13 explains the step of connecting said second plates 5 and 6 of said first 1 and second 2 capacitors through a third capacitor 30. FIG. 13 includes: the first 1 and the second 2 capacitors, whose capacities are chosen equal to each other; the inductive reactance device 25 which can be adjustable; a first resistance voltage divider with adjustable resistances $R_1$, $R_2$ and $R_3$; a second resistance voltage divider with additional adjustable resistances $R_{1A}$, $R_{2A}$ and $R_{3A}$; the two-way switch 9; switching devices 26, 27 and 28; a device 29 for measuring the total power S and its active P and reactive Q components. This embodiment permits changing the capacity of the adjustable capacitor 8 by changing a value of said part of voltage of said operating electric circuit or network or a value of said full voltage of said operating electric circuit or network. This embodiment also permits changing the capacity of the adjustable capacitor 8 by changing the direction of said part of voltage of the operating electric circuit or network or by changing the direction of said full voltage of said operating electric circuit or network. The two-way switch 9 of the adjustable capacitor 8 ensures changing the direction of said voltages. The step of applying a part of voltage of said operating electric circuit or network or a full voltage of said operating electric circuit or network to second plates 5 and 6 of said first 1 and second 2 capacitors is realized by the steps of: connecting second terminals of the first $R_1$ and the second $R_2$ adjustable resistances, which are equal to each other, to first and second terminals of the third adjustable resistance $R_3$ respectively;

choosing the values of the first additional $R_{1A}$, the second additional $R_{2A}$ and the third additional $R_{3A}$ adjustable resistances much bigger than the values of said first $R_1$, second $R_2$ and third $R_3$ adjustable resistances respectively by following expression:

$R_{1A}/R_1=R_{2A}/R_2=R_{3A}/R_3;$ connecting second terminals of said first additional $R_{1A}$ and second additional $R_{2A}$ adjustable resistances, which are equal to each other, to first and second terminals of said third additional adjustable resistance $R_{3A}$ respectively;

connecting different potentials of said operating electric circuit or network through first terminals of said first $R_1$ and second $R_2$ adjustable resistances;

connecting different potentials of said operating electric circuit or network through first terminals of said first additional $R_{1A}$ and second additional $R_{2A}$ adjustable resistances similar to the connection of different potentials of said operating electric circuit or network through first terminals of said first $R_1$ and second $R_2$ adjustable resistances;

connecting second plates 5 and 6 of said first 1 and second 2 capacitors through said first and second terminals of said third adjustable resistance $R_3$ respectively;

connecting second plates 5 and 6 of said first 1 and second 2 capacitors through said first and second terminals of said third additional adjustable resistance $R_{3A}$ respectively;

disconnecting electrical connections of second plates 5 and 6 of said first 1 and second 2 capacitors through said first and second terminals of said third adjustable resistance $R_3$. This embodiment permits changing the capacity of the adjustable capacitor 8 by changing said first $R_1$ and second $R_2$ resistances equally or by changing said third $R_3$ resistance or by changing said first $R_{1A}$ and second $R_{2A}$ additional resistances equally or by changing said third additional resistance $R_{3A}$. The adjustable capacitor 8 also can function without said second resistance voltage divider;

FIG. 14 explains the step of connecting said second output terminals T1-2 and T2-2 of said first 1 and second 2 groups of capacitors through a reactor 31, which can be adjustable, and the step of connecting said second output terminals T1-2 and T2-2 of said first 1 and second 2 groups of capacitors through a third group of capacitors 30. FIG. 14 includes: the first 1 and the second 2 groups of capacitors, whose capacities are chosen equal to each other; the third group of capacitors 30; the reactor 31 which can be adjustable; the first resistance voltage divider with adjustable resistances $R_1$, $R_2$ and $R_3$; the second resistance voltage divider with additional adjustable resistances $R_{1A}$, $R_{2A}$ and $R_{3A}$; the two-way switch 9; switching devices 26, 27 and 28. The adjustable capacitor 8 also can function without said second resistance voltage divider;

FIG. 15 includes: the first 1 and the second 2 capacitors, whose capacities are chosen equal to each other; the inductive reactance device 25 which can be adjustable; the third capacitor 30; the first resistance voltage divider with adjustable resistances $R_1$, $R_2$ and $R_3$; the second resistance voltage divider with additional adjustable resistances $R_{1A}$, $R_{2A}$ and $R_{3A}$; the two-way switch 9; switching devices 26, 27, 28 and 32; a device 29 for measuring the total power S and its active P and reactive Q components; a load 33. This embodiment permits changing the capacity of the adjustable capacitor 8 by transmitting a part of energy of said capacitors and/or the inductive reactance device 25 in a supplementary electric circuit 33. The adjustable capacitor 8 also can function without said second resistance voltage divider;

FIG. 16 includes: the first 1 and the second 2 capacitors, whose capacities are chosen equal to each other; the inductive reactance device 25 which can be adjustable; the third capacitor 30; the first resistance voltage divider with adjustable resistances $R_1$, $R_2$ and $R_3$; the second resistance voltage divider with additional adjustable resistances $R_{1A}$, $R_{2A}$ and $R_{3A}$; the two-way switch 9; switching devices 26, 27, 28, 32 and 34; a device 29 for measuring the total power S and its active P and reactive Q components; a load 33; a transformer 37. This embodiment permits changing the capacity of the adjustable capacitor 8 by transmitting a part of energy of said capacitors and/or said inductive reactance device 25 in a supplementary electric circuit 33. The adjustable capacitor 8 also can function without said second resistance voltage divider;

FIG. 17 explains the step of connecting said second output terminals T1-2 and T2-2 of said first 1 and second 2 groups of capacitors through the reactor 31, which can be adjustable, and the step of connecting said second output terminals T1-2 and T2-2 of said first 1 and second 2 groups of capacitors through the third group of capacitors 30. FIG. 17 includes: the first 1 and the second 2 groups of capacitors, whose capacities are chosen equal to each other; the third group of capacitors 30; the reactor 31 which can be adjustable; the two-way switch 9; a device 29 for measuring the total power S and its active P and reactive Q components; resistaces 38 which can be adjustable; the voltage source 7 whose terminals F and G of opposite polarities are equally insulated with regard to the ground and whose created voltage on said terminals F and G is a voltage of the same type that the voltage of an operating electric circuit or a network (D and E are the points of said operating electric circuit or network). This embodiment permits changing the capacity of the adjustable capacitor 8 by changing a value of said control voltage (applied to said second output terminals T1-2 and T2-2 of said first 1 and second 2 groups of capacitors) created by the voltage source 7 or by changing the direction of said control voltage. The two-way switch 9 of the adjustable capacitor 8 ensures changing the direction of said control voltage;

FIG. 18 includes: the first 1 and the second 2 capacitors, whose capacities are chosen equal to each other; the inductive reactance device 25 which can be adjustable; the third capacitor 30; the two-way switch 9; a switching device 32; a load 33; a transformer 37; resistaces 38 which can be adjustable; a phase-shift device 39; the voltage source 7 whose terminals F and G of opposite polarities are equally insulated with regard to the ground and whose created voltage on said terminals F and G is a voltage of the same type that the voltage of an operating electric circuit or a network (D and E are the points of said operating electric circuit or network). This embodiment permits changing the capacity of the adjustable capacitor 8 by changing a value of said control voltage (applied to second plates 5 and 6 of said first 1 and second 2 capacitors) or by changing a phase-shift φ between said control voltage and the voltage of said operating electric circuit or network (applied to first plates 3 and 4 of said first 1 and second 2 capacitors) or by changing the direction of said control voltage. The two-way switch 9 of the adjustable capacitor 8 ensures changing the direction of said control voltage;

FIG. 19 explains the step of repeating all said steps or a part of said steps for each phase A, B and C in case of a three-phase network or a three-phase circuit. This realization includes: three adjustable capacitors 8 in star connection with said operating electric circuit or network; three no adjustable capacitors 40 or three groups of no adjustable capacitors 40; thyristor switching devices 41. This technical solution also can function without said no adjustable capacitors 40 or without said groups of no adjustable capacitors 40;

FIG. 20 explains the steps of:
measuring or calculating a power factor or a current or a power or a voltage, of said operating electric circuit or network, or their reactive and active components;
receiving signals or values of said measuring or calculating;
and using said signals or values in said step of changing:
the value of said control voltage or the value of said part of voltage of said operating electric circuit or network or the value of said full voltage of said operating electric circuit or network;

or the phase-shift between said control voltage and the voltage of said operating electric circuit or network or the phase-shift between said full voltage or the part of voltage of said operating electric circuit or network, applied to second plates of said first and second capacitors or to said second output terminals of said first and second groups of capacitors, and the voltage of said operating electric circuit or network, applied to first plates of said first and second capacitors or to said first output terminals of said first and second groups of capacitors. FiG. 20 includes: devices of measuring currents $A_1$, $A_2$ and $A_3$; devices of measuring powers $W_1$, $W_2$ and $W_3$; devices of measuring voltages $V_1$, $V_2$ and $V_3$; switching devices 41 and 43; the adjustable capacitors 8 with a control unit 42;

FIG. 21 includes: the first 1 and the second 2 capacitors, whose capacities are chosen equal to each other; switching devices 26, 27, 28, 44 and 45;. a load L. FIG. 21 explains the steps of: connecting said operating electric circuit or network (D and E are the points of said operating electric circuit or network) through the first plates 3 and 4 of said first 1 and second 2 capacitors; connecting said second plates 5 and 6 of said first and second capacitors through the third capacitor 30; applying a part of voltage of said operating electric circuit or network or a full voltage of said operating electric circuit or network to second plates 5 and 6 of said first 1 and second 2 capacitors. The step of connecting electrically plates of said third capacitor 30 within discharging of said first 1 and second 2 capacitors is realized by the switching device 44. This embodiment permits changing the capacity of the adjustable capacitor 8 by changing a value of said part of voltage of said operating electric circuit or network or a value of said full voltage of said operating electric circuit or network. The step of applying a part of voltage of said operating electric circuit or network or a full voltage of said operating electric circuit or network to second plates 5 and 6 of said first 1 and second 2 capacitors is realized by the steps of: choosing the first $R_1$ and the second $R_2$ adjustable resistances equal to each other; connecting first and second terminals of the third $R_3$ adjustable resistance to second terminals of said first $R_1$ and second $R_2$ adjustable resistances respectively; connecting different potentials of said operating electric circuit or network through first terminals of said first $R_1$ and second $R_2$ adjustable resistances; connecting second plates 5 and 6 of said first and second capacitors through said first and second terminals of said third resistance $R_3$ respectively. This embodiment permits changing the capacity of the adjustable capacitor 8 by changing said first $R_1$ and second $R_2$ resistances equally or by changing said third $R_3$ resistance. In FIG. 21 the operating electric circuit or the network is presented as the operating electric circuit or the network of direct current. This technical solution provides full discharging of the first 1 and the second 2 capacitors. When said operating electric circuit or network is an operating electric circuit or a network of alternating current, the adjustable capacitor 8, presented in said FIG. 21, can function without the switching device 44 or when the switching device 44 is off all the time;

FIG. 22 includes: the first 1 and the second 2 capacitors, whose capacities are chosen equal to each other; switching devices 26, 44 and 45; a load L; the voltage source 7 whose terminals F and G of opposite polarities are equally insulated with regard to the ground and whose created voltage is a voltage of direct current. FIG. 22 explains the steps of: connecting said operating electric circuit or network through the first plates 3 and 4 of said first 1 and second 2 capacitors; connecting said second plates 5 and 6 of said first and second capacitors through the third capacitor 30; applying a control voltage to second plates 5 and 6 of said first 1 and second 2 capacitors by said voltage source 7. The step of connecting electrically plates of said third capacitor 30 within discharging of said first 1 and second 2 capacitors is realized by the switching device 44. This embodiment provides full discharging of the first 1 and the second 2 capacitors and permits changing the capacity of the adjustable capacitor 8 by changing a value of said control voltage, created by the voltage source 7;

FIG. 23 includes: the first 1 and the second 2 capacitors, whose capacities are chosen equal to each other; the resistance voltage divider with the first $R_1$, the second $R_2$ adjustable resistances, equal to each other, and the third $R_3$ adjustable resistance; switching devices 26, 27, 28 and 45; a diode 46; a load L. FIG. 23 explains the steps of: connecting said operating electric circuit or network (D and E are the points of said operating electric circuit or network) through the first plates 3 and 4 of said first 1 and second 2 capacitors; connecting said second plates 5 and 6 of said first and second capacitors through the third capacitor 30; applying a part of voltage of said operating electric circuit or network or a full voltage of said operating electric circuit or network to second plates 5 and 6 of said first 1 and second 2 capacitors. The step of connecting electrically plates of said third capacitor 30 within discharging of said first 1 and second 2 capacitors is realized through the diode 46 which is installed against current of charging of the third capacitor 30. This embodiment provides full discharging of the first 1 and the second 2 capacitors and permits changing the capacity of the adjustable capacitor 8 by changing said first $R_1$ and second $R_2$ resistances equally or by changing said third $R_3$ resistance. This technical solution also permits applying a voltage to said third capacitor 30 within charging of said capacitors;

FIG. 24 includes: the first 1 and the second 2 capacitors, whose capacities are chosen equal to each other; switching devices 26 and 45; a load L; the voltage source 7 whose terminals F and G of opposite polarities are equally insulated with regard to the ground and whose created voltage is a voltage of direct current. FIG. 24 explains the steps of: connecting said operating electric circuit or network through the first plates 3 and 4 of said first 1 and second 2 capacitors; connecting said second plates 5 and 6 of said first and second capacitors through the third capacitor 30; applying a control voltage to second plates 5 and 6 of said first 1 and second 2 capacitors by said voltage source 7. The step of connecting electrically plates of said third capacitor 30 within discharging of said first 1 and second 2 capacitors is realized through the diode 46 which is installed against current of charging of the third capacitor 30. This embodiment provides full discharging of the first 1 and the second 2 capacitors and permits changing the capacity of the adjustable capacitor 8 by changing a value of said control voltage, created by the voltage source 7. This technical solution also permits applying a control voltage to said third capacitor 30 within charging of said capacitors;

FIG. 25 includes: the first 1 and the second 2 capacitors, whose capacities are chosen equal to each other; the resistance voltage divider with the first $R_1$, the second $R_2$ adjustable resistances, equal to each other, and the third $R_3$ adjustable resistance; switching devices 26, 27, 28, 45, 47 and 48; a load L. FIG. 25 explains the steps of: connecting said operating electric circuit or network (D and E are the points of said operating electric circuit or network) through the first plates 3 and 4 of said first 1 and second 2 capacitors; connecting said second plates 5 and 6 of said first and second capacitors through the third capacitor 30; applying a part of voltage of said operating electric circuit or network or a full voltage of said operating electric circuit or network to second plates 5 and 6 of said first 1 and second 2 capacitors. The step of connecting electrically plates of said first capacitor 1 and plates of said second capacitor 2 within discharging of said third capacitor 30 is realized by switching devices 47 and 48. This embodiment provides full discharging of the third capacitor 30 and permits changing the capacity of the adjustable capacitor 8 by changing at least one of said first $R_1$, second $R_2$, and third $R_3$ resistances;

FIG. 26 includes: the first 1 and the second 2 capacitors, whose capacities are chosen equal to each other; switching devices 26, 45, 47 and 48;. a load L; the voltage source 7 whose terminals F and G of opposite polarities are equally insulated with regard to the ground and whose created voltage is a voltage of direct current. FIG. 26 explains the steps of: connecting said operating electric circuit or network through the first plates 3 and 4 of said first 1 and second 2 capacitors; connecting said second plates 5 and 6 of said first and second capacitors through the third capacitor 30; applying a control voltage to second plates 5 and 6 of said first 1 and second 2 capacitors by said voltage source 7. The step of connecting electrically plates of said first capacitor 1 and plates of said second capacitor 2 within discharging of said third capacitor 30 is realized by switching devices 47 and 48. This embodiment provides full discharging of the third capacitor 30 and permits changing the capacity of the adjustable capacitor 8 by changing a value of said control voltage, created by the voltage source 7;

FIG. 27 includes: the first 1 and the second 2 capacitors, whose capacities are chosen equal to each other; the resistance voltage divider with the first $R_1$, the second $R_2$ adjustable resistances, equal to each other, and the third $R_3$ adjustable resistance; switching devices 26, 27, 28 and 45; additional diodes 49 and 50; a load L. FIG. 27 explains the steps of: connecting said operating electric circuit or network (D and E are the points of said operating electric circuit or network) through the first plates 3 and 4 of said first 1 and second 2 capacitors; connecting said second plates 5 and 6 of said first and second capacitors through the third capacitor 30; applying a part of voltage of said operating electric circuit or network or a full voltage of said operating electric circuit or network to second plates 5 and 6 of said first 1 and second 2 capacitors. The step of connecting electrically plates of said first capacitor 1 and plates of said second capacitor 2 within discharging of said third capacitor 30 is realized through two additional diodes 49 and 50 which are installed against current of charging of said first 1 and second 2 capacitors. This embodiment provides full discharging of the third capacitor 30 and permits changing the capacity of the adjustable capacitor 8 by changing at least one of said first $R_1$, second $R_2$, and third $R_3$ resistances;

FIG. 28 includes: the first 1 and the second 2 capacitors, whose capacities are chosen equal to each other; switching devices 26 and 45; additional diodes 49 and 50; a load L; the voltage source 7 whose terminals F and G of opposite polarities are equally insulated with regard to the ground and whose created voltage is a voltage of direct current. FIG. 26 explains the steps of: connecting said operating electric circuit or network through the first plates 3 and 4 of said first 1 and second 2 capacitors; connecting said second plates 5 and 6 of said first 1 and second 2 capacitors through the third capacitor 30; applying a control voltage to second plates 5 and 6 of said first 1 and second 2 capacitors by said voltage source 7. The step of connecting electrically plates of said first capacitor 1 and plates of said second capacitor 2 within discharging of said third capacitor 30 is realized through two additional diodes 49 and 50 which are installed against current of charging of said first 1 and second 2 capacitors. This embodiment provides full discharging of the third capacitor 30 and permits changing the capacity of the adjustable capacitor 8 by changing a value of said control voltage created by the voltage source 7;

FIG. 29 includes: the first 1, the second 2 and the third 30 capacitors; a resistance voltage divider with the first $R_1$, the second $R_2$, and the third $R_3$ adjustable resistances; switching devices 26, 27, 28, 44, 45, 47 and 48; a load L. This technical solution provides full discharging of the adjustable capacitor 8 by the step of connecting electrically plates of said third capacitor 30 within discharging of said first 1 and second 2 capacitors or connecting electrically plates of said first capacitor 1 and plates of said second capacitor 2 within discharging of said third capacitor 30. The step of connecting electrically plates of said third capacitor 30 within discharging of said first 1 and second 2 capacitors is realized by the switching device 44. The step of connecting electrically plates of said first capacitor 1 and plates of said second capacitor 2 within discharging of said third capacitor 30 is realized by switching devices 47 and 48. This embodiment permits changing the capacity of the adjustable capacitor 8 by changing at least one of said first $R_1$, second $R_2$, and third $R_3$ resistances;

FIG. 30 includes: the first 1, the second 2 and the third 30 capacitors; switching devices 26, 44, 45, 47 and 48; a load L; the voltage source 7 whose terminals F and G of opposite polarities are equally insulated with regard to the ground and whose created voltage is a voltage of direct current. This technical solution provides full discharging of the adjustable capacitor 8 by the step of connecting electrically plates of said third capacitor 30 within discharging of said first 1 and second 2 capacitors or connecting electrically plates of said first capacitor 1 and plates of said second capacitor 2 within discharging of said third capacitor 30. The step of connecting electrically plates of said third capacitor 30 within discharging of said first 1 and second 2 capacitors is realized by the switching device 44. The step of connecting electrically plates of said first capacitor 1 and plates of said second capacitor 2 within discharging of said third capacitor 30 is realized by switching devices 47 and 48. This embodiment permits changing the capacity of the adjustable capacitor 8 by changing a value of said control voltage, created by the voltage source 7;

FIG. 31 includes: the first 1, the second 2 and the third 30 capacitors; a resistance voltage divider with the first $R_1$, the second $R_2$, and the third $R_3$ adjustable resistances; switching devices 26, 27, 28 and 45; diodes 46, 49 and 50; a load L. This technical solution provides full discharging of the adjustable capacitor 8 by the step of connecting electrically plates of said third capacitor 30 within discharging of said first 1 and second 2 capacitors or connecting electrically plates of said first capacitor 1 and plates of said second capacitor 2 within discharging of said third capacitor 30. The step of connecting electrically plates of said third capacitor 30 within discharging of said first 1 and second 2 capacitors is realized through the diode 46 which is installed against current of charging of the third capacitor 30. The step of connecting electrically plates of said first capacitor 1 and plates of said second capacitor 2 within discharging of said third capacitor 30 is realized through two additional diodes 49 and 50 which are installed against current of charging of said first 1 and second 2 capacitors. This embodiment permits changing the capacity of the adjustable capacitor 8 by changing at least one of said first $R_1$, second $R_2$, and third $R_3$ resistances;

FIG. 32 includes: the first 1, the second 2 and the third 30 capacitors; switching devices 26 and 45; diodes 46, 49 and 50; a load L; the voltage source 7 whose terminals F and G of opposite polarities are equally insulated with regard to the ground and whose created voltage is a voltage of direct current. This technical solution provides full discharging of the adjustable capacitor 8 by the step of connecting electrically plates of said third capacitor 30 within discharging of said first 1 and second 2 capacitors or connecting electrically plates of said first capacitor 1 and plates of said second capacitor 2 within discharging of said third capacitor 30. The step of connecting electrically plates of said third capacitor 30 within discharging of said first 1 and second 2 capacitors is realized through the diode 46 which is installed against current of charging of the third capacitor 30. The step of connecting electrically plates of said first capacitor 1 and plates of said second capacitor 2 within discharging of said third capacitor 30 is realized through two additional diodes 49 and 50 which are installed against current of charging of said first 1 and second 2 capacitors. This embodiment permits changing the capacity of the adjustable capacitor 8 by changing a value of said control voltage, created by the voltage source 7;

FIG. 33 explains the steps of: detecting the voltage of said third capacitor 30, within its discharging, by a detector of voltages 52; receiving signals of detecting; and using said signals (by a control unit 53 of an arrester 44) in the step of connecting electrically the plates of said third capacitor;

FIG. 34 explains the steps of: detecting the voltage of at least one of said first 1 and second 2 capacitors, within their discharging, by detectors of voltages 55 or 58; receiving signals of detecting; and using said signals (by a control unit 56 of an arrester 47 or by a control unit 59 of an arrester 48) in said step of connecting electrically the plates of said first 1 and second 2 capacitors;

FIG. 35a illustrates one embodiment in which the adjustable capacitor 8 is connected to an operating electric circuit or a network through a switching device 60 and a resistance 61.

FIG. 35b illustrates one embodiment in which the adjustable capacitor 8 is connected to an operating electric circuit or a network through a switching device 60 and an inductive reactance 62.

FIG. 35c illustrates one embodiment in which the adjustable capacitor 8 is connected to an operating electric circuit or a network through a load L.

FIG. 35d illustrates one embodiment in which the adjustable capacitor 8 is connected to an operating electric circuit or a network through a bridge rectifier 63 and a load L.

Figure 36:
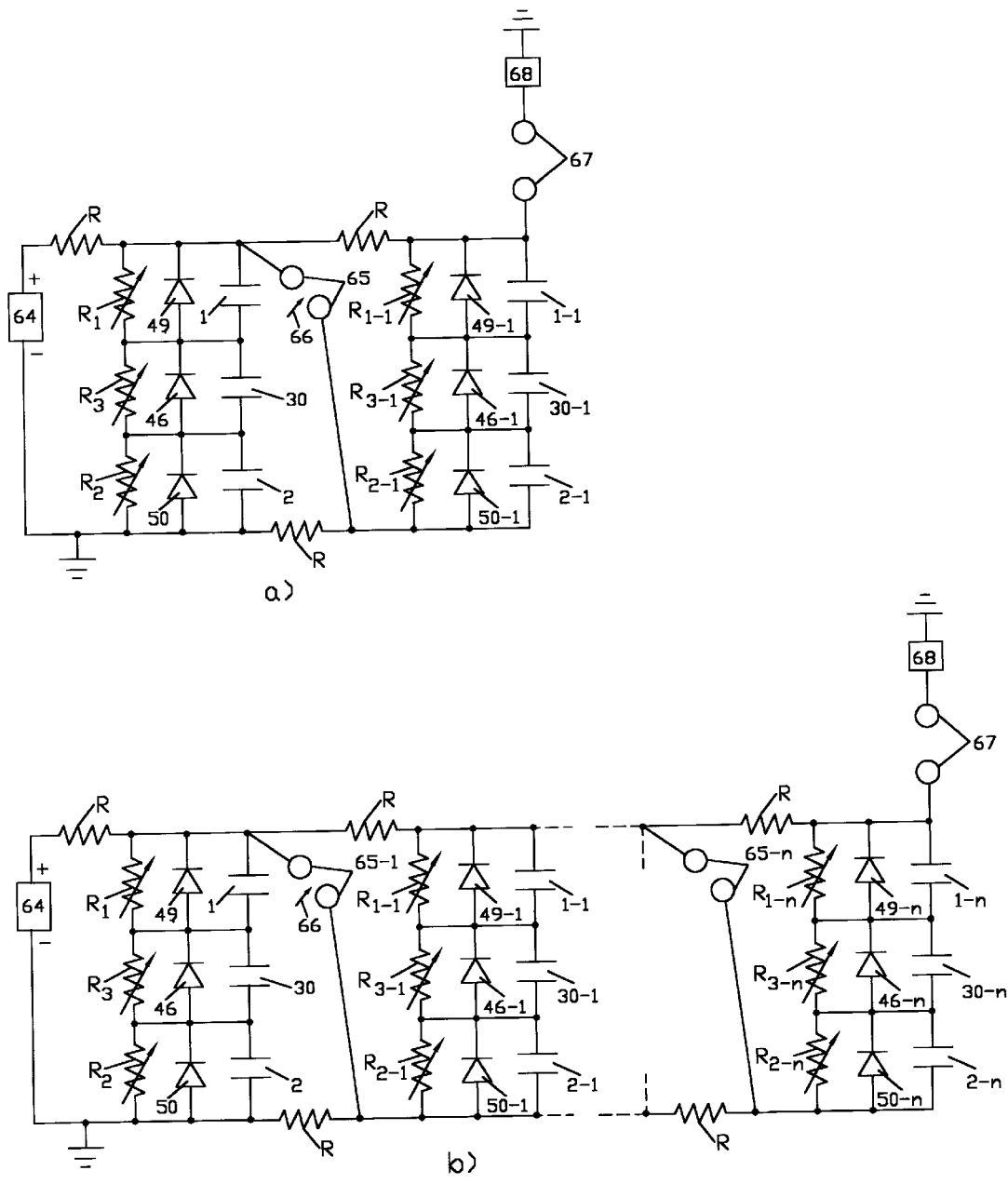
FIG. 36a illustrates a technical solution which permits multiplying a voltage of an operating electric circuit or a network with stepless control of the total capacity.
FIG. 36b illustrates another technical solution which permits multiplying a voltage of an operating electric circuit or a network with stepless control of the total capacity.
Figure 37:
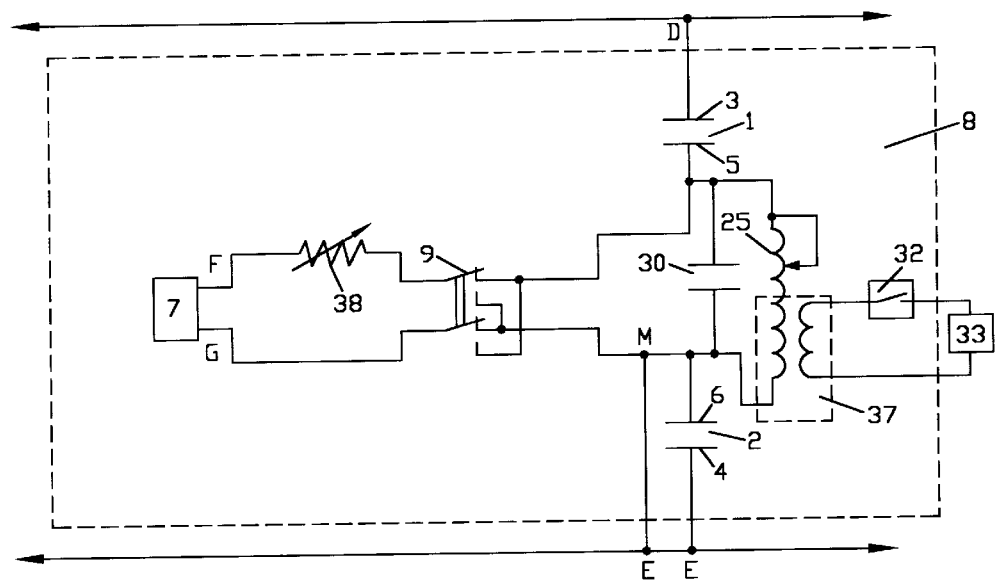
FIG. 37 illustrates that the technical solutions, which realize the first way of obtaining the adjustable capacitor, can be transformed into technical solutions which realize the second way of obtaining the adjustable capacitor.

FIG. 36a illustrates a technical solution which permits increasing a voltage of a voltage source 64 about two times with steplees control of the capacity of the adjustable capacitor. FIG. 36a includes: the first 1, the second 2 and the third 30 capacitors; 3 other capacitors 1-1, 2-1 and 30-1; a resistance voltage divider with the first $R_1$, the second $R_2$ and the third $R_3$ adjustable resistances; another resistance voltage divider with a first $R_{1-1}$, a second $R_{2-1}$ and a third $R_{3-1}$ adjustable resistances; diodes 46, 49 and 50; 3 other diodes 46-1, 49-1 and 50-1; resistances R; an arrester 65 with a starting electrode 66; an arrester 67; a load 68. A spark gap can be used as an arrester. The diodes 46, 49, 50, 46-1, 49-1 and 50-1 provide full discharging of the adjustable capacitor. This technical solution permits changing the capacity of the adjustable capacitor by changing said $R_1$, $R_2$, and $R_{1-1}$, $R_{2-1}$ adjustable resistances or by changing said $R_3$ and $R_{3-1}$ adjustable resistances or by changing at least one of said adjustable resistances $R_1$, $R_2$, $R_3$, $R_{1-1}$, $R_{2-1}$, $R_{3-1}$;

FIG. 36b illustrates a technical solution which permits increasing a voltage of a voltage source 64 about (1+n) times with steplees control of the capacity of the adjustable capacitor. FIG. 36b includes: the first 1, the second 2 and the third 30 capacitors; a first triplets of other capacitors 1-1, 2-1 and 30-1; a $n^{th}$ triplets of other capacitors 1-n, 2-n, 30-n; a resistance voltage divider with the first $R_1$, the second $R_2$ and the third $R_3$ adjustable resistances; another resistance voltage divider with a first $R_{1-1}$, a second $R_{2-1}$ and a third $R_{3-1}$ adjustable resistances; a voltage divider with first $R_{1-n}$, second $R_{2-n}$ and third $R_{3-n}$ adjustable resistances; diodes 46, 49 and 50; a first triplets of other diodes 46-1, 49-1 and 50-1; a $n^{th}$ triplets of other diodes 46-n, 49-n, 50-n; resistances R; a first arrester 65 with a starting electrode 66, a $n^{th}$ arrester 65-n; an arrester 67; a load 68. The diodes 46, 49, 50, 46-1, 49-1, 50-1, 46-n, 49-n, 50-n provide full discharging of the adjustable capacitor. This technical solution permits changing the capacity of the adjustable capacitor by changing at least one of said adjustable resistances;

FIG. 37 illustrates that the technical solutions with the first 1, the second 2 and the third 30 capacitors or with the first 1, the second 2 and the third 30 groups of capacitors, which realize the first way of obtaining the adjustable capacitor, can be transformed into technical solutions which realize the second way of obtaining the adjustable capacitor by the step of connecting a short circuit ME in parallel with the second capacitor 2 or with the second group of capacitors.

Figure 38:
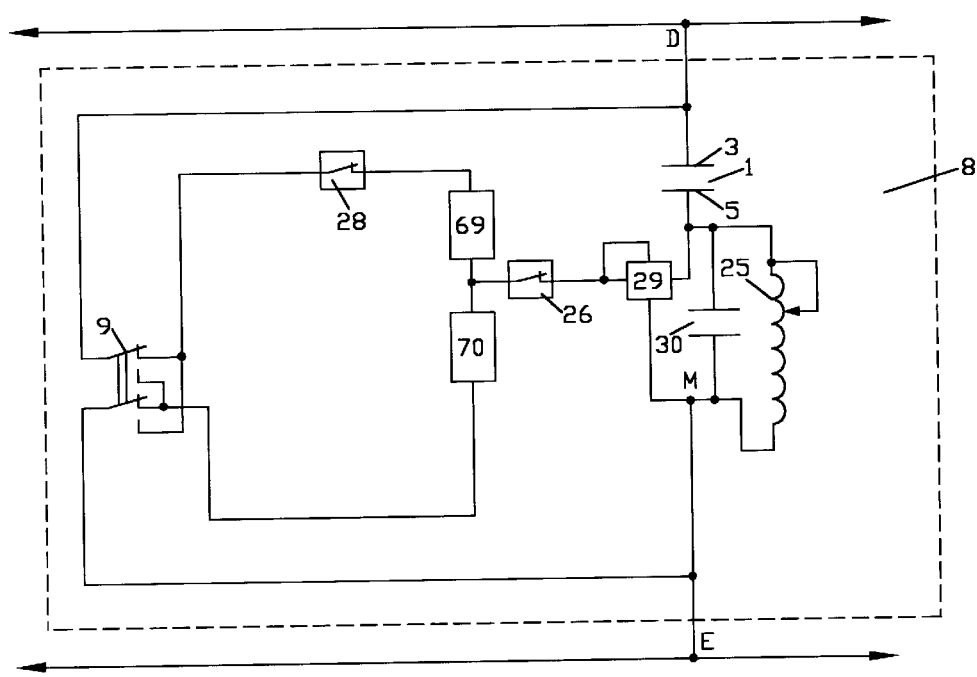
FIG. 38 illustrates that the technical solutions with the third 30 capacitor and a voltage divider, which realize the first way of obtaining the adjustable capacitor, also can be transformed into technical solutions which realize the second way of obtaining the adjustable capacitor.

FIG. 38 illustrates that the technical solutions with the first 1, the second 2, the third 30 capacitors and said voltage divider having three arms, which realize the first way of obtaining the adjustable capacitor, can be transformed into technical solutions which realize the second way of obtaining the adjustable capacitor, with a voltage divider having two arms 69 and 70, by the step of connecting a short circuit ME in parallel with the second capacitor 2. This technical solution permits changing the capacity of the adjustable capacitor 8 by the step of changing reactance or resistance or state of at least one of said arms 69 and 70.

Figure 39:
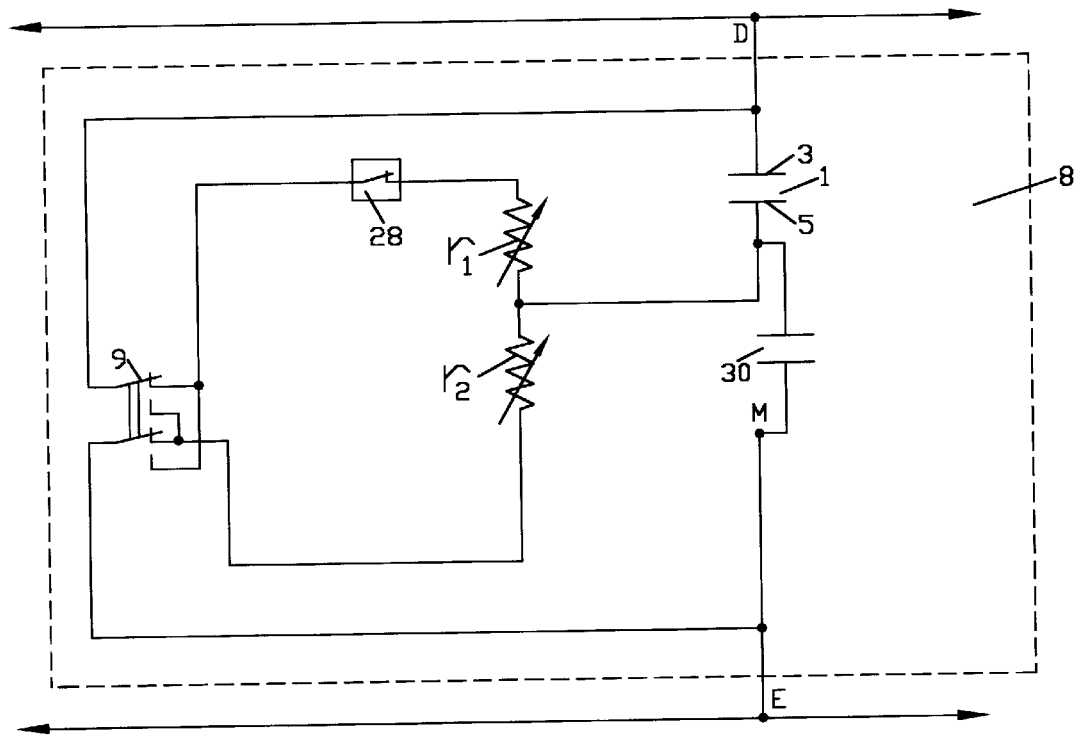
FIG. 39 illustrates the adjustable capacitor 8, obtained on the base of the first 1 and the third 30 capacitors and a resistor voltage divider.

FIG. 39 explains the steps of: connecting a first 1 and a third 30 capacitors in series; connecting an operating electric circuit or a network through said serially connected capacitors (D and E are the points of said operating electric circuit or network); applying a part of voltage of said operating electric circuit or network or a full voltage of said operating electric circuit or network to plates of said third capacitor. This technical solution permits changing the capacity of the adjustable capacitor 8 by changing a value of said part of voltage of said operating electric circuit or network or a value of said full voltage of said operating electric circuit or network, applied to the third capacitor 30. Said technical solution also permits changing the capacity of the adjustable capacitor 8 by changing the direction of said part of voltage of the operating electric circuit or network or by changing the direction of said full voltage of said operating electric circuit or network. The two-way switch 9 of the adjustable capacitor 8 ensures changing the direction of said voltages. The step of applying a part of voltage of said operating electric circuit or network or a full voltage of said operating electric circuit or network to the third capacitor 30 is realized by a resistance voltage divider with serially connected a first $r_1$ and a second $r_2$ adjustable resistances. Different potentials of said operating electric circuit or network are connected through said resistance voltage divider, plates of said first 1 and third 30 capacitors are connected through one and other of said adjustable resistances $r_1$ and $r_2$ respectively. This technical solution permits changing the capacity of the adjustable capacitor 8 by changing at least a value of one of said adjustable resistances $r_1$ and $r_2$.

Figure 40:
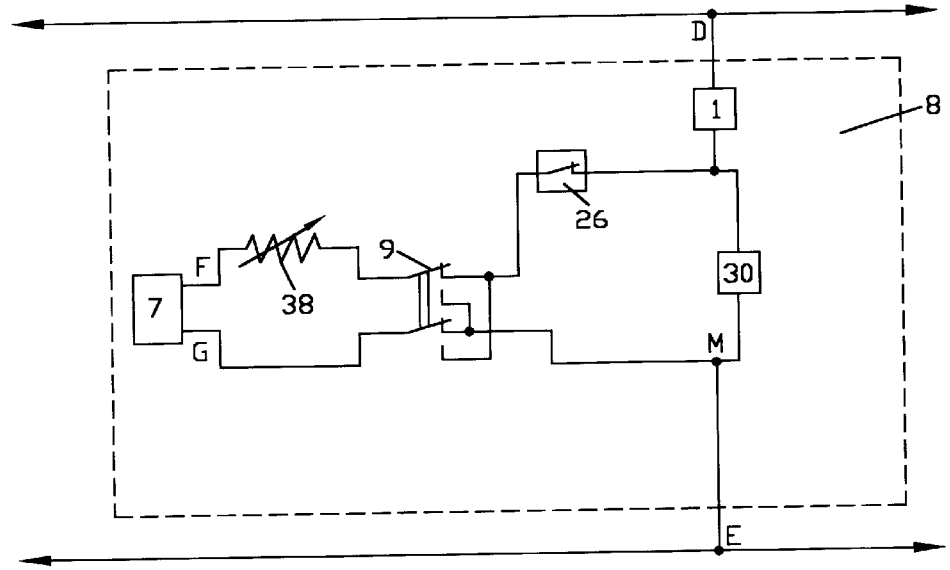
FIG. 40 illustrates the adjustable capacitor 8, with a voltage source 7, obtained on the base of the first 1 and the third 30 group of capacitors having two output terminals, each.

FIG. 40 includes: the first 1 and the third 30 groups of capacitors; the voltage source 7 whose created voltage is a voltage of the same type that a voltage of the operating electric circuit or the network (D and E are the points of said operating electric circuit or network); the two-way switch 9;

a resistance 38 and a switching device 26. FIG. 40 explains the steps of: connecting the first group of capacitors 1, having two output terminals, and the third group of capacitors 30, having two output terminals, in series; connecting said operating electric circuit or network through said serially connected groups of capacitors; applying a control voltage to first and second output terminals of said third group of capacitors 30 by said voltage source 7. This technical solution permits changing the capacity of the adjustable capacitor 8 by changing a value of said control voltage, created by the voltage source 7, or by changing the direction of said control voltage. The two-way switch 9 of the adjustable capacitor 8 ensures changing the direction of said control voltage.

Figure 41:
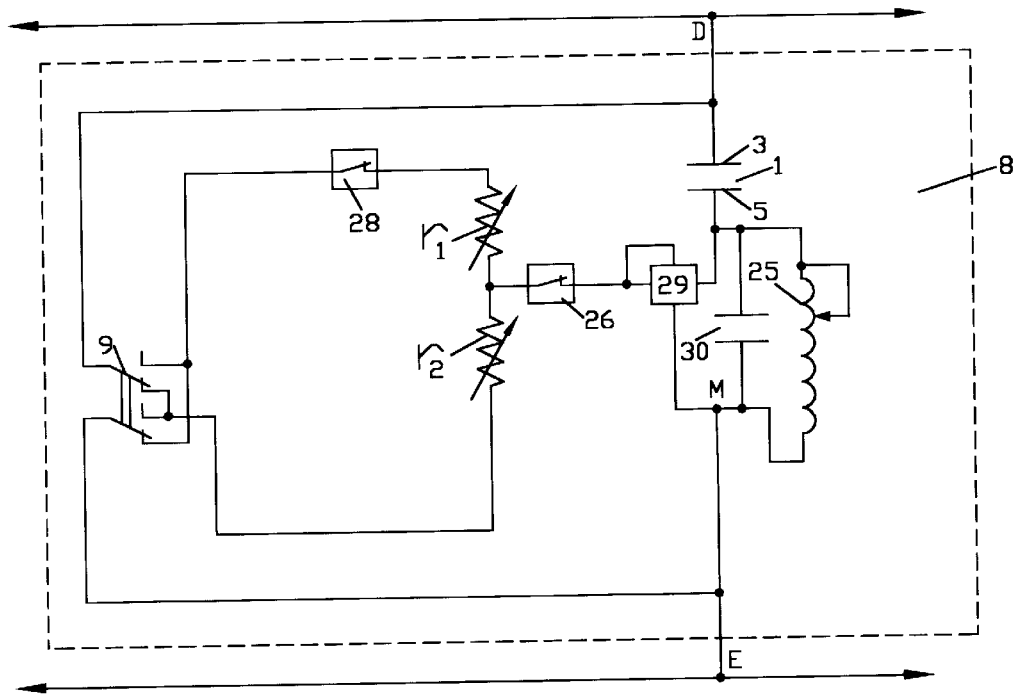
FIG. 41 illustrates one embodiment of the adjustable capacitor 8 including the step of connecting plates of the third capacitor 30 through an inductive reactance device 25.

FIG. 41 explains the step of connecting plates of said third capacitor 30 through an inductive reactance device 25 which can be adjustable. FIG. 41 includes: serially connected the first 1 and the third 30 capacitors; the resistance voltage divider with the first $r_1$ and the second $r_2$ adjustable resistances; switching devices 26 and 28; the two-way switch 9; a device 29 for measuring the total power S and its active P and reactive Q components. This technical solution permits changing the capacity of the adjustable capacitor 8 by changing at least a value of one of said adjustable resistances $r_1$ and $r_2$.

Figure 42:
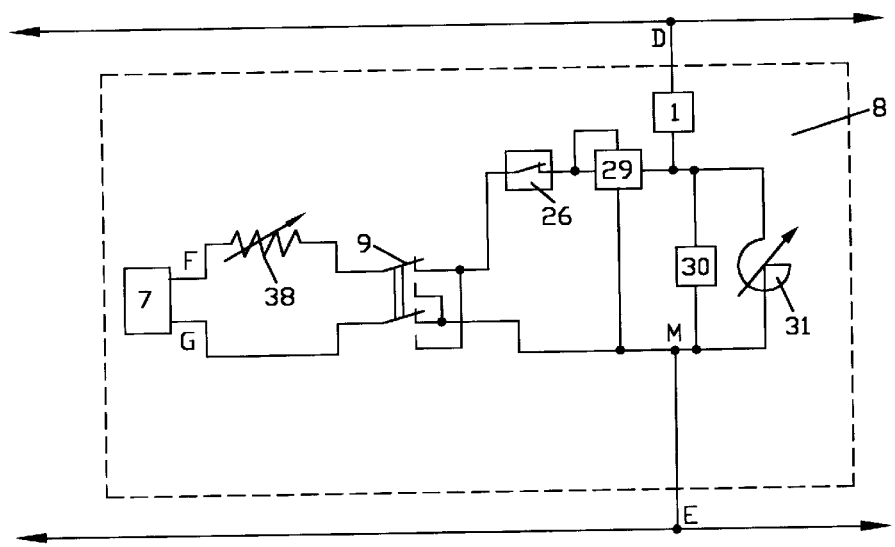
FIG. 42 illustrates one embodiment of the adjustable capacitor 8, including the step of connecting output terminals of the third group of capacitors through a reactor 31.

FIG. 42 explains the steps of: connecting the first group of capacitors 1, having two output terminals, and the third group of capacitors 30, having two output terminals, in series; connecting said operating electric circuit or network through said serially connected groups of capacitors; applying a control voltage to first and second output terminals of said third group of capacitors 30 by the voltage source 7; connecting first and second output terminals of said third group of capacitors 30 through the reactor 31 which can be adjustable. This technical solution permits changing the capacity of the adjustable capacitor 8 by changing a value of said control voltage, created by the voltage source 7, or by changing the direction of said control voltage. The two-way switch 9 of the adjustable capacitor 8 ensures changing the direction of said control voltage.

Figure 43:
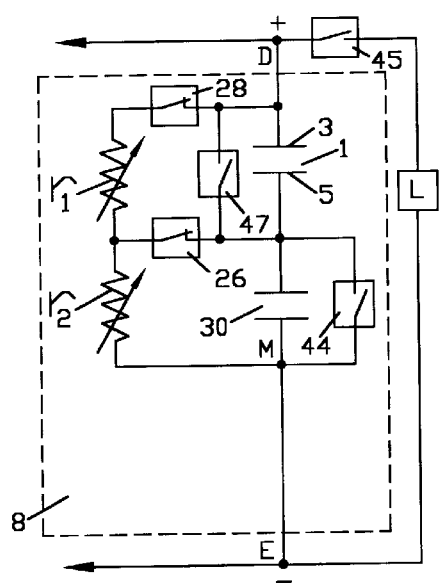
FIG. 43 illustrates one embodiment of the adjustable capacitor 8 which provides full discharging of the adjustable capacitor 8.

FIG. 43 includes: the first 1 and the third 30 capacitors; the resistance voltage divider with the first $r_1$ and the second $r_2$ adjustable resistances; switching devices 26, 28, 44, 45 and 47; a load L. FIG. 43 explains the steps of: connecting the first 1 and the third 30 capacitors in series; connecting an operating electric circuit or a network of direct current through said serially connected capacitors (D and E are the points of said operating electric circuit or network); applying a part of voltage of said operating electric circuit or network or a full voltage of said operating electric circuit or network to plates of said third capacitor 30; connecting electrically plates of said third capacitor 30, within discharging of said first capacitor 1, by the switching device 44. This technical solution provides full discharging of the first capacitor 1 and permits changing the capacity of the adjustable capacitor 8 by changing at least a value of one of said adjustable resistances $r_1$ and $r_2$.

Figure 44:
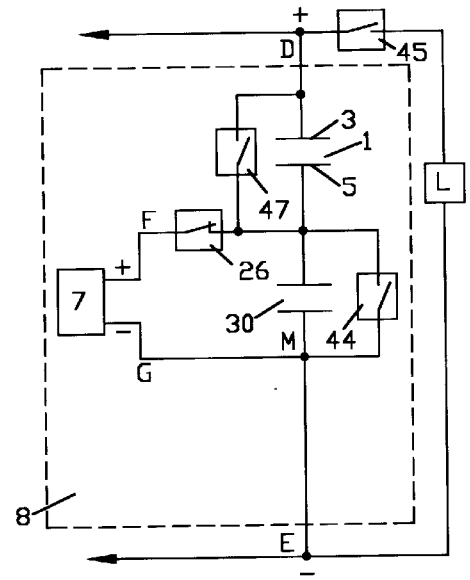
FIG. 44 illustrates one embodiment of the adjustable capacitor 8, with a voltage source 7, which provides full discharging of the adjustable capacitor 8.

FIG. 44 includes: the first 1 and the third 30 capacitors; switching devices 26, 44, 45 and 47; a load L; the voltage source 7 whose created voltage is a voltage of direct current. FIG. 44 explains the steps of: connecting the first 1 and the third 30 capacitors in series; connecting an operating electric circuit or a network of direct current through said serially connected capacitors (D and E are the points of said operating electric circuit or network); applying a control voltage to plates of said third capacitor 30 by said voltage source 7; connecting electrically plates of said third capacitor 30, within discharging of said first capacitor 1, by the switching device 44. This technical solution provides full discharging of the first capacitor 1 and permits changing the capacity of the adjustable capacitor 8 by changing a value of said control voltage.

Figure 45:
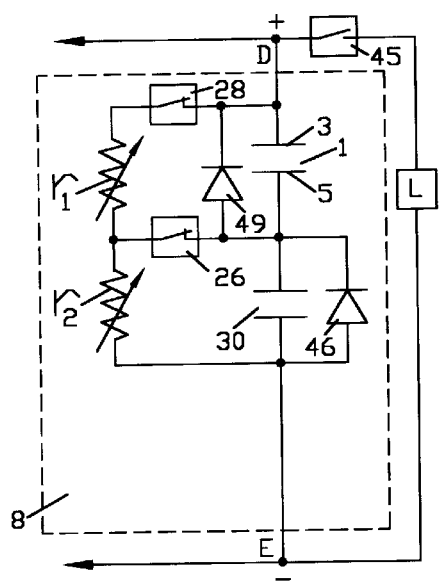
FIG. 45 illustrates one embodiment of the adjustable capacitor 8 with diodes 46 and 49 which provide full discharging of the adjustable capacitor 8.

FIG. 45 includes: the first 1 and the third 30 capacitors; the resistance voltage divider with the first $r_1$ and the second $r_2$ adjustable resistances; switching devices 26, 28, and 45; a diode 46 which is installed against current of charging of said third capacitor 30; an additional diode 49 which is installed against current of charging of said first capacitor 1; a load L. FIG. 45 explains the steps of: connecting the first 1 and the third 30 capacitors in series; connecting an operating electric circuit or a network of direct current through said serially connected capacitors (D and E are the points of said operating electric circuit or network); applying a part of voltage of said operating electric circuit or network or a full voltage of said operating electric circuit or network to plates of said third capacitor 30; connecting electrically plates of said third capacitor 30, within discharging of said first capacitor 1, or connecting electrically plates of said first capacitor 1 within discharging of said third capacitor 30. The step of connecting electrically plates of said third capacitor 30, within discharging of said first capacitor 1, is realized through the diode 46. The step of connecting electrically plates of said first capacitor 1, within discharging of said third capacitor 30, is realized through the diode 49. Said diodes 46 and 49 provide full discharging of the first 1 and the third 30 capacitors respectively. This technical solution provides full discharging of the adjustable capacitor 8 and permits changing the capacity of the adjustable capacitor 8 by changing at least a value of one of said adjustable resistances $r_1$ and $r_2$.

Figure 46:
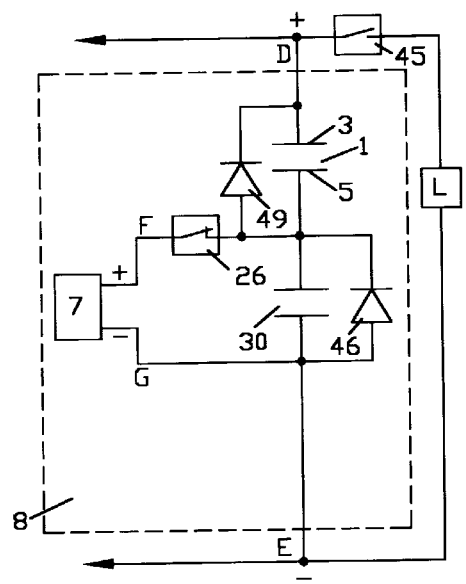
FIG. 46 illustrates a second embodiment of the adjustable capacitor 8 with diodes 46 and 49 which provide full discharging of the adjustable capacitor 8.

FIG. 46 includes: the first 1 and the third 30 capacitors; the voltage source 7 whose created voltage is a voltage of direct current; a diode 46 which is installed against current of charging of said third capacitor 30; an additional diode 49 which is installed against current of charging of said first capacitor 1; switching devices 26 and 45; a load L. FIG. 46 explains the steps of: connecting the first 1 and the third 30 capacitors in series; connecting an operating electric circuit or a network of direct current through said serially connected capacitors (D and E are the points of said operating electric circuit or network); applying a control voltage to plates of said third capacitor 30 by said voltage source 7; connecting electrically plates of said third capacitor 30, within discharging of said first capacitor 1, or connecting electrically plates of said first capacitor 1 within discharging of said third capacitor 30. The step of connecting electrically plates of said third capacitor 30, within discharging of said first capacitor 1, is realized through the diode 46. The step of connecting electrically plates of said first capacitor 1, within discharging of said third capacitor 30, is realized through the diode 49. Said diodes 46 and 49 provide full discharging of the first 1 and the third 30 capacitors respectively. This technical solution provides full discharging of the adjustable capacitor 8 and permits changing the capacity of the adjustable capacitor 8 by changing a value of said control voltage.

Figure 47:
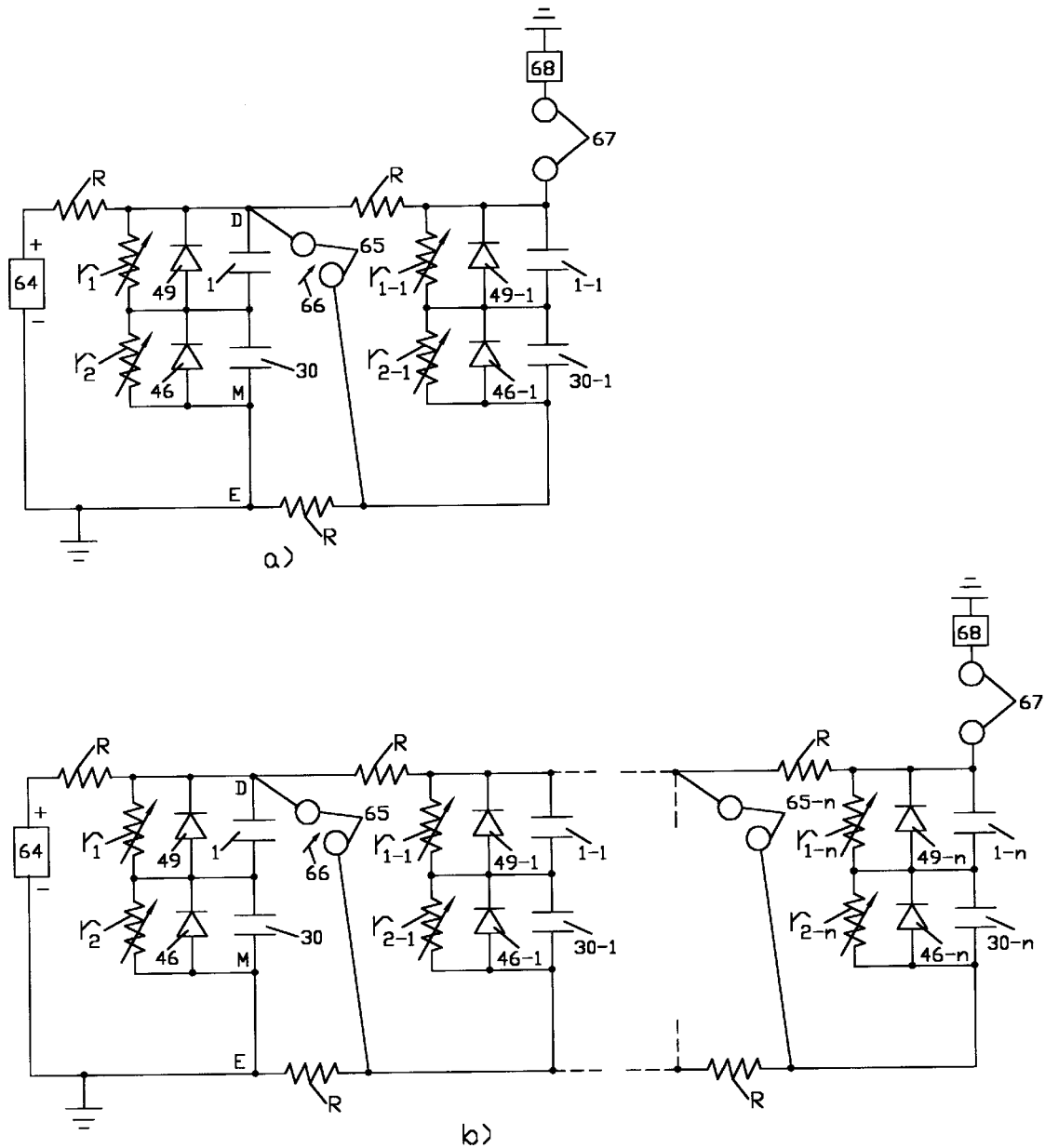
FIG. 47a illustrates one embodiment which permits multiplying a voltage of an operating electric circuit or a network with stepless control of the total capacity.
FIG. 47b illustrates second embodiment which permits multiplying a voltage of an operating electric circuit or a network with stepless control of the total capacity.

FIG. 47a illustrates a technical solution which permits increasing a voltage of a voltage source 64 about two times with steplees control of the capacity of the adjustable capacitor. FIG. 47a includes: the first 1 and the third 30 capacitors; 2 other capacitors 1-1 and 30-1; a resistance voltage divider with the first $r_1$ and the second $r_2$ adjustable resistances; another resistance voltage divider with a first r1-1 and a second $r_{2-1}$ adjustable resistances; diodes 46, and 49; 2 other diodes 46-1 and 49-1; resistances R; an arrester 65 with a starting electrode 66; an arrester 67; a load 68. A spark gap can be used as an arrester. The diodes 46, 49, 46-1 and 49-1 provide fill discharging of the adjustable capacitor. This technical solution permits changing the capacity of the adjustable capacitor by changing said $r_1$ and $r_{1-1}$ adjustable resistances or by changing said $r_2$ and $r_{2-1}$ adjustable resistances or by changing at least one of said adjustable resistances $r_1$, $r_2$, $r_{1-1}$, $r_{2-1}$.

FIG. 47b illustrates a technical solution which permits increasing a voltage of a voltage source 64 about (1+n) times with steplees control of the capacity of the adjustable capacitor. FIG. 47b includes: the first 1 and the third 30 capacitors; a first pair of other capacitors 1-1 and 30-1; a nth pair of other capacitors 1-n, 30-n; a resistance voltage divider with the first $r_1$ and the second $r_2$ adjustable resistances; another resistance voltage divider with a first $r_{1-n}$ and a second $r_{2-n}$ adjustable resistances; a voltage divider with a first $r_{1-n}$ and a second $r_{2-1}$ adjustable resistances; diodes 46 and 49; a first pair of other diodes 46-1 and 49-1; a $n^{th}$ pair of other diodes 46-n, 49-n; resistances R; a first arrester 65 with a starting electrode 66, a $n^{th}$ arrester 65-n; an arrester 67; a load 68. The diodes 46, 49, 46-1, 49-1, 46-n, 49-n provide full discharging of the adjustable capacitor. This technical solution permits changing the capacity of the adjustable capacitor by changing at least one of said adjustable resistances.

The step of choosing a voltage source whose terminals of opposite polarities are equally insulated with regard to the ground and whose created voltage on said terminals is a voltage of the same type that the voltage of an operating electric circuit or a network permits sustaining absolute values of potential differences on said first 1 and second 2 capacitors or on said first 1 and second 2 groups of capacitors equal to each other and ensures:

$$|q_3(t)|=|q_4(t)|, \quad (1)$$

$$|q_5(t)|=|q_6(t)|, \quad (2)$$

where: $q_3(t)$, $q_4(t)$, $q_5(t)$ and $q_6(t)$ are instantaneous values of charges respectively on plates 3, 4, 5 and 6 of said first 1 and second 2 capacitors; t is a time.

For the realizations with applying a part of voltage of said operating electric circuit or network or a full voltage of said operating electric circuit or network to second plates 5 and 6 of said first 1 and second 2 capacitors (FIG. 4, FIG. 5, FIG. 6, FIG. 7, FIG. 8, FIG. 9, FIG. 12, FIG. 13, FIG. 15 and FIG. 16) or to second output terminals of said first 1 and second 2 groups of capacitors (FIG. 14), sustaining absolute values of potential differences on said first 1 and second 2 capacitors or on said first 1 and second 2 groups of capacitors equal to each other is achieved by:

a voltage divider with the first 10, the second 11 and the third 12 branches (FIG. 7 and FIG. 9) or with the first 10, the second 11 and the third 12 arms (FIG. 4 and FIG. 8), which can change their reactances or resistances or states, or by the first resistance voltage divider with the first $R_1$, the second $R_2$ and the third $R_3$ adjustable resistances (FIG. 5, FIG. 6, FIG. 12, FIG. 13, FIG. 14, FIG. 15 and FIG. 16), where said first and second branches or said first and second arms or said first $R_1$ and second $R_2$ adjustable resistances are equal to each other;

and by step of changing reactances or resistances or states of said first and second branches equally or changing reactances or resistances or states of said first and second arms equally or changing said first $R_1$ and second $R_2$ resistances equally or by step of changing reactance or resistance or state of said third branch or of said third arm or by step of changing of said third $R_3$ resistance.

One can change the first $R_1$ and the second $R_2$ resistances simultaneously and equally by moving the slide 13 which is mechanically connected to sliding contacts of said first $R_1$ and second $R_2$ adjustable resistances (FIG. 6). The slide 13 can be connected with a control unit of capacity variation of the adjustable capacitor 8. When the frequency of said operating electric circuit or network is not high, slide rheostats, for example, can be used as first $R_1$, second $R_2$ and third $R_3$ adjustable resistances. In case of a high frequency, it is necessary to use non-inductive adjustable resistances $R_1$, $R_2$ and $R_3$.

One can change resistances and states of said first 10 and second 11 branches (FIG. 7) or resistances of said first 10 and second 11 arms (FIG. 8) simultaneously and equally by changing the luminous flux of the light source 20 optically connected to photo-electric devices 18 and 19.

The method of achieving the purpose of changing the capacity of the adjustable capacitor by changing a value of said part of voltage of said operating electric circuit or network or a value of said full voltage of said operating electric circuit or network is demonstrated below.

For realizations shown in FIG. 5 and FIG. 6 voltages and charges are given by following expressions:

$$U_0(t)=U_1(t)+U_{R3}(t)+U_2(t) \quad (3)$$

$$U_0(t)=U_{R1}(t)+U_{R2}(t)+U_{R3}(t) \quad (4)$$

$$U_1(t)=U_2(t) \quad (5)$$

$$|q_3(t)|=|q_4(t)|=C_1 \times U_1(t) \quad (6)$$

$$|q_3 \max|=|q_4 \max|=C_1 \times U_1 \max, \quad (7)$$

where: $U_0(t)$-is an instantaneous voltage of the operating electric circuit or network; $U_1(t)$ and $U_2(t)$ are instantaneous voltages on the first 1 and the second 2 capacitors; $U_{R1}(t)$, $U_2(t)$ and $U_{R3}(t)$ are instantaneous voltages on the first $R_1$, the second $R_2$ and the third $R_3$ adjustable resistances; $C_1$ is the capacity of the first capacitor 1 which is equal to the capacity $C_2$ of the second capacitor ($C_1=C_2$); $U_1$max is the maximum voltage on the first capacitor 1; $|q_3\max|$ and $|q_4\max|$ are accordingly maximum values of charges on first plates 3 and 4 of said first 1 and second 2 capacitors.

For the realization shown in FIG. 5, in case of the phase-shift $\phi$ between voltages $U_0(t)$ and $U_{R3}(t)$ is equal to zero (similarly to the phase-shift $\phi$ between voltages shown in FIG. 10a and FIG. 10b) and $R_1=0$, $R_2=0$, $R_3>0[U_{R3}(t)=U_0(t)]$, the capacity $C_A$ of the adjustable capacitor is equal to zero:

$$C_A=0, \quad (8)$$

because $|q_3(t)|=|q_4(t)|=0$.

For the realization shown in FIG. 5, in case of $R_3=0$ [$U_{R3}(t)=0$], $R_1=R_2>0$ and the phase-shift $\phi_1$ between voltages $U_0(t)$ and $U_{R1}(t)$ is equal to zero (similarly to the phase-shift $\phi$ between voltages shown in FIG. 10a and FIG. 10b), the capacity $C_A$ of the adjustable capacitor is given by following expression:

$$C_A=C_1/2 \quad (9)$$

For the realization shown in FIG. 6, in case of $\phi=180°$ (similarly to the phase-shift $\phi$ between voltages shown in FIG. 10a and FIG. 10c) and $R_1=0$, $R_2=0$, $R_3>0$[$U_{R3}(t)=-U_0(t)$], the capacity $C_A$ of the adjustable capacitor is equal to $2\times C_1$:

$$C_A=2\times C_1 \quad (10)$$

Therefore, by changing a value of the voltage applied to second plates 5 and 6 of said first 1 and second 2 capacitors or applied to second output terminals of said first and second groups of capacitors, one can change the capacity $C_A$ of the adjustable capacitor within limits:

$$0\leq C_A\leq 2\times C_1 \quad (11)$$

In case of $\phi=180°$ (FIG. 11a and FIG. 11b) and $U_a>U_0$, where $U_a$ is an control voltage creating by the voltage source 7 (FIG. 1, FIG. 2, FIG. 3, FIG. 17 and FIG. 18), the capacity $C_A$ of the adjustable capacitor is more than $C_1$:

$$C_A>C_1 \quad (12)$$

Therefore, by changing a value of the control voltage, one can change the capacity $C_A$ of the adjustable capacitor theoretically without maximal limit.

For realizations shown in (FIG. 1, FIG. 2, FIG. 3, FIG. 17 and FIG. 18), in case of $\phi=0$ 11a and FIG. 11c) and $U_a>U_0$, the adjustable capacitor 8 functions as a source of energy and transforms the energy into the operating electric circuit or network. Therefore, the adjustable capacitor 8 (FIG. 19 and FIG. 20) can realize two different purposes:

1. It can fuinction as a Power-Factor-Correction Adjustable Capacitor;
2. It can function as a source of energy and can be used, for example, for the voltage stabilization of an electric circuit or a network.

It follows from above expressions (8) and (10) that by changing the phase-shift $\phi$ within limits $0\leq\phi\leq 180°$ (FIG. 18), one can change the capacity $C_A$ of the adjustable capacitor within limits:

$$0\leq C_A\leq C_1 \quad (13)$$

One can change $\phi$ by the phase-shift device 39 (FIG. 18) or by changing values of adjustable inductive reactances 23 and 24 equally (FIG. 9).

The step of connecting said second plates 5 and 6 of said first 1 and second 2 capacitors or second output terminals of said first 1 and second 2 groups of capacitors through at least one inductive reactance device 25 (FIG. 12) or at least one reactor 31 (FIG. 14), which can be adjustable, decreases the energy loss. After charging the first 1 and the second 2 capacitors, this step allows interrupting circuit (by switching off switching devices 26, 27 and 28) of the first resistance voltage divider with at least first $R_1$, second $R_2$ and third $R_3$ adjustable resistances (FIG. 12). One can choose the optimum value of the inductance $L_{op1}$ of the adjustable inductive reactance device 25 (FIG. 12) or the adjustable reactor by changing values of inductances L of the adjustable inductive reactance device 25 or by changing values of inductances L of the adjustable reactor, measuring total powers S by the device 29 (FIG. 12) and registering the minimum total power $S_{min1}$.

$L=L_{op1}$, when $S=S_{min1}$, where $L_{op1}$ is the optimum value of the inductance of the adjustable inductive reactance device 25 which ensures the maximum recovery of electric charges on said first 1 and second 2 capacitors (FIG. 12).

The energy losses can be decreased (FIG. 13, FIG. 14, FIG. 15, FIG. 16 and FIG. 17) by the steps of:

connecting said second plates of said first 1 and second 2 capacitors or second output terminals of said first 1 and second 2 groups of capacitors through at least one inductive reactance device 25 or at least one reactor 31 which can be adjustable;

connecting said second plates 5 and 6 of said first 1 and second 2 capacitors or second output terminals of said first 1 and second 2 groups of capacitors through at least a third capacitor 30 or at least a third group of capacitors 30;

changing and registering values of inductances L of said inductive reactance device 25 or said reactor 31; measuring (by the device 29), registering or calculating values of total powers S or at least one of their active P and reactive Q components in the circuit of said control voltage (FIG. 17) or in the circuit of said part of voltage of said operating electric circuit or network (FIG. 13) or in the circuit of said full voltage of said operating electric circuit or network, which is connected to second plates of said first and second capacitors or which is connected to said second output terminals of said first and second groups of capacitors;

choosing optimum values of inductances $L_{op}$ of the inductive reactance device 25 or the reactor 31 by conditions:

$L=L_{op}$, when $S=S_{min}$, or when $P=P_{min}$, or when $Q=Q_{min}$, where:

$S_{min}$, $P_{min}$ and $Q_{min}$ are respectively values of minimum total, active and reactive powers.

After charging the first 1 and the second 2 capacitors, these steps allow:

interrupting circuits of the first resistance voltage divider (by switching off switching devices 26, 27 and 28) and of the second voltage divider (FIG. 16) with at least a first additional $R_{1A}$, a second additional $R_{2A}$ and a third additional $R_{3A}$ adjustable resistances (by switching off switching devices 34, 35 and 36). Then, by the steps of periodically connecting and disconnecting the second voltage divider (by switching on and switching off switching devices 34, 35 and 36) one can periodically recover the energy loss in branches with the first 1, the second 2, the third 30 capacitors and the inductive reactance device 25 or the reactor 31;

in a moment $t_1$ or $t_3$ or $t_5$ (FIG. 10), interrupting the circuit of the control voltage (by switching off switching devices 26) which is connected to second plates 5 and 6 of said first 1 and second 2 capacitors or to second output terminals of said first and second groups of capacitors (FIG. 17). Then by the steps of periodically connecting and disconnecting the control voltage (by switching on and switching off the switching device 26) one can periodically recover the energy loss in branches with said first 1, second 2, third 30 capacitors or said first 1, second 2, third 30 groups of capacitors (FIG. 17) and the inductive reactance device 25 or the reactor 31.

$L_{op}$ is different for different realizations. For example:

a) In case of $\phi=0$, $U_0>U_a$ (FIG. 17, FIG. 10a and FIG. 10b) and $|q_{30}max|>|q_5max|$, the value of the inductance $L_{op2}$ of the adjustable reactor 31 (L=$L_{op2}$, when S=$S_{min2}$) ensures the maximum recovery of charges $+\Delta q_2$ and $-\Delta q_2$, where:

$$|\Delta q_2| \approx |q_{30}max|-|q_5max|, \quad (14)$$

$|q_{30}max|$ is a value of maximum charge on the plate of said third capacitor 30 (FIG. 13) or on the plate(s) of said third group of capacitors 30 (FIG. 17) connected to the first output terminal of the third group of capacitors, $|q_5max|$ is a value of maximum charge on the plate 5 of said first capacitor 1 or on the plate(s) connected to the second output terminal $T_{1-2}$ of said first group of capacitors 1 (FIG. 17);

b) In case of $\phi=180°$ (FIG. 17, FIG. 10a and FIG. 10c), the value of the inductance $L_{op3}$ of the adjustable reactor 31 (L=$L_{op3}$, when S=$S_{min3}$) ensures the maximum recovery of charges $+\Delta q_3$ and $-\Delta q_3$, where:

$$|\Delta q_3| \approx |q_{30}max|+|q_5max| \quad (15)$$

The step of interrupting the circuit of said control voltage (by switching off switching device 26) or interrupting the circuit of said part of voltage of said operating electric circuit or network (by switching off switching devices 26, 27, 34, 35 and 36) or interrupting the circuit of said full voltage of said operating electric circuit or network, which is connected to second plates 5 and 6 of said first 1 and second 2 capacitors or to second output terminals of said first 1 and second 2 groups of capacitors (FIG. 16 and FIG. 17), within discharging of said capacitors excludes the energy losses on the first, on the second voltage dividers and in the control voltage circuit within discharging of said capacitors. For example, said step of interrupting can be realized by switching off switching device 26 during periods of time $t_2-t_1$, $t_4-t_3$, $t_6-t_5$, etc and by switching on switching device 26 (FIG. 17) during periods of time $t_1-t_0$, $t_3-t_2$, $t_5-t_4$, etc (FIG. 10a, FIG. 10b).

One can decrease a voltage U applied to second plates 5 and 6 of the first 1 and second 2 capacitors or to second output terminals of said first 1 and second 2 groups of capacitors by the step of transforming or transmitting a part of energy of said capacitors 1, 2 and 30 and/or said inductive reactance device 25 or said adjustable reactor 31 in a supplementary electric circuit. This step excludes the energy losses on the first, on the second voltage dividers and in the control voltage circuit within changing the capacity $C_A$ of the adjustable capacitor. For example (FIG. 15 and FIG. 16), by switching on the switching device 32, one can transmit or transform a part of energy of capacitors 1, 2, 30 and the adjustable inductive reactance device 25 in a supplementary electric circuit with the load 33. By switching off the switching device 32, one can stop the process of decreasing said voltage U and the process of changing the capacity $C_A$ of the adjustable capacitor.

Realizations (FIG. 16 and FIG. 18) in which the adjustable inductive reactance device 25 or a part of it is realized as a transformer 37 allow to change the maximum voltage on the load 33. A device for the energy accumulation or a device for heating can be used as the load 33.

In case of a three-phase network or a three-phase circuit all of said steps or a part of them can be repeated for each phase (FIG. 19 and FIG. 20).

One can obtain the Power-Factor-Correction Adjustable Capacitor or the Voltage-Stabilization Adjustable Capacitor with automatic control by the steps of (FIG. 20):

measuring or calculating a power factor or a current or a power or a voltage, of said operating electric circuit or network, or their reactive and active components;

receiving signals or values of said measuring or calculating;

and using said signals or values in said step of changing:
the value of said control voltage or the value of said part of voltage of said operating electric circuit or network or the value of said fill voltage of said operating electric circuit or network;

or the phase-shift between said control voltage and the voltage of said operating electric circuit or network or the phase-shift between said full voltage or the part of voltage of said operating electric circuit or network, applied to second plates of said first and second capacitors or to said second output terminals of said first and second groups of capacitors, and the voltage of said operating electric circuit or network.

The control unit 42 (FIG. 20) uses all said signals or values or a part of them in the step of changing the capacity $C_A$ of the adjustable capacitor.

For realizations shown in FIG. 21, FIG. 23, FIG. 25, FIG. 27, FIG. 29 and FIG. 31, after finishing the process of charging the adjustable capacitor 8, voltages and the energy of the adjustable capacitor $W_A$ are given by following expressions:

$$U_0=U_1+U_{30}+U_2 \quad (16)$$

$$U_1=U_2 \quad (17)$$

$$U_{30}=U_{R3} \quad (18)$$

$$W_A=\tfrac{1}{4} \times C_1 \times (U_0-U_{R3})^2+\tfrac{1}{2} \times C_{30} \times U_{R3}^2 \quad (19)$$

$$W_A=\tfrac{1}{2} \times C_A \times U_0^2, \quad (20)$$

where: $U_0$— is the voltage of the operating electric circuit or network; $U_1$ and $U_2$ are voltages on the first 1 and second 2 capacitors; $UR_3$ is a voltage on the third $R_3$ adjustable resistance; $C_1$ is the capacity of the first capacitor 1 which is equal to the capacity $C_2$ of the second capacitor ($C_1=C_2$); $C_{30}$ is the capacity of the third capacitor 30.

It follows from above expressions (19) and (20) that:
In case of $R_1=0$, $R_2=0$, $R_3>0$ [$U_{R3}=U_0$], the capacity $C_A$ of the adjustable capacitor is equal to $C_{30}$:

$$C_A=C_{30} \quad (21)$$

In case of $R_3=0$ [$U_{R3}=0$], $R_1=R_2>0$ the capacity $C_A$ of the adjustable capacitor is given by following expression:

$$C_A=C_1/2 \quad (22)$$

Therefore, by changing a value of the voltage applied to second plates 5 and 6 of said first 1 and second 2 capacitors or applied to second output terminals of said first 1 and second 2 groups of capacitors, in case of $C_{30}>C_1/2$, one can change the capacity $C_A$ of the adjustable capacitor within limits:

$$C_1/2 \leq C_A \leq C_{30} \quad (23)$$

By changing a value of voltage, applied to second plates 5 and 6 of said first 1 and second 2 capacitors or applied to second output terminals of said first 1 and second 2 groups of capacitors, in case of $C_{30}<C_1/2$, one can change the capacity $C_A$ of the adjustable capacitor within limits:

$$C_{30} \leq C_A \leq C_1/2 \quad (24)$$

Consequently, in case of $C_{30}/C_1=100$, one can change the capacity $C_A$ of the adjustable capacitor approximately 200 times, in case of $C_{30}/C_1=1000$ one can change the capacity $C_A$ of the adjustable capacitor approximately 2000 times etc.

After finishing the process of charging the adjustable capacitor 8, the energy loss can be decreased by switching off switching devices 26, 27 and 28 (FIG. 21, FIG. 22, FIG. 23, FIG. 24, FIG. 25, FIG. 26, FIG. 27, FIG. 28, FIG. 29, FIG. 30, FIG. 31 and FIG. 32). The process of discharging can be started by switching on the switching device 45. Then, after finishing the process of discharging, the process of charging can be repeated by switching on switching devices 26, 27 and 28.

The step of connecting electrically plates of said third capacitor or output terminals of the third group of capacitors within discharging of said first and second capacitors or said first and second groups of capacitors ensures the full discharging of said first 1 and second 2 capacitors (FIG. 21, FIG. 22, FIG. 23 and FIG. 24) or said first and second groups of capacitors, in case of $C_{30} \times U_{30} < C_1 \times U_1$. This step is realized at the end of discharging of the third capacitor 30 or in time when discharging of the third capacitor is finished by switching on the switching device 44 or by the diode 46 which is installed against current of charging said third capacitor 30 (FIG. 21, FIG. 22, FIG. 23, FIG. 24, FIG. 29, FIG. 30, FIG. 31 and FIG. 32).

The step of connecting electrically plates of said first capacitor 1 or output terminals of said first group of capacitors and plates of said second capacitor 2 or output terminals of said second group of capacitors within discharging of said third capacitor 30 or said third group of capacitors ensures the full discharging of the third capacitor 30 (FIG. 25, FIG. 26, FIG. 27 and FIG. 28) or the third group of capacitors, in case of $C_{30} \times U_{30} > C_1 \times U_1$. This step is realized at the end of discharging of the first capacitor 1 or in time when discharging of the first capacitor 1 is finished by switching on switching devices 47 and 48 or by diodes 49 and 50 which are respectively installed against current of charging said first I and second 2 capacitors (FIG. 25, FIG. 26, FIG. 27, FIG. 28, FIG. 29, FIG. 30, FIG. 31 and FIG. 32).

The realizations shown in FIG. 29, FIG. 30, FIG. 31 and FIG. 32 ensure the full discharging of capacitors 1, 2 and 30 in all cases.

In case of a big discharging current, the step of connecting electrically capacitor plates of said capacitors 1, 2 and 30 can be realized by thyristors or arresters. When the adjustable capacitor must be discharged during a period of time, which is of the order of microseconds and less, the step of connecting electrically capacitor plates of said capacitors 1, 2 and 30 are realized by arresters 44, 47 and 48 with starting electrodes 51, 54 and 57 or can be realized by triodes or thyratrons. Control units 53, 56 and 59 form trigger pulses respectively for starting electrodes 51, 54 and 57. The step of detecting voltages of said capacitors 1, 2 and 30 within their discharging are realized by detectors of voltages 52, 55 and 58. Control units 53, 56 and 59 of arresters 44, 47 and 48 use signals of detecting in the step of connecting electrically capacitor plates of said capacitors 1, 2 and 30.

The first plate of said first or second capacitor or the first output terminal of said first or second groups of capacitors of the adjustable capacitor 8 can be connected to an operating electric circuit through at least one additional branch or one load. For example, said first plate or said first output terminal of the adjustable capacitor 8 can be connected to an operating electric circuit through:

a resistance 61 and a switching device 60 (FIG. 35a);
an inductive reactance 62 and a switching device 60 (FIG. 35b);
a load L and a switching device 60 (FIG. 35c);
a rectifier 63, a load L and a switching device 60 (FIG. 35d);
a switching device 41 (FIG. 19);
the second adjustable capacitor 8 (FIG. 19).

The technical solutions, in which said step of connecting an operating electric circuit or a network through first plates of said first and second capacitors or through first output terminals of said first and second groups of capacitors is realized through a load L (FIG. 35c) or through a bridge rectifier 63 and a load L (FIG. 35d), permit smoothly changing a power consumption of said load L. These technical solutions permit increasing the functional potentialities of the adjustable capacitor 8.

The steps of:

choosing three other capacitors 1-1, 2-1 and 30-1 (FIG. 36a);

repeating on said other capacitors 1-1, 2-1 and 30-1 all steps which are realized with said first 1 second 2 and third 30 capacitors;

connecting the first 1, the second 2, the third 30 and other capacitors 1-1, 2-1 and 30-1 in series during discharging of said all capacitors 1, 2, 30, 1-1, 2-1 and 30-1 ensure obtaining a voltage $U_L$ on a load 68 about two times more than a voltage $U_L$ of a voltage source 64 of the operating electric circuit with revolutionary broad ranges of changing the capacity $C_A$ of the adjustable capacitor.

$$U_L \approx 2U_S \qquad (25)$$

The step of connecting the first 1, the second 2, the third 30 and other capacitors 1-1, 2-1 and 30-1 in series and the step of discharging all capacitors are realized by switching on the arrester 65 because $$2U_S > U_{B-67} \qquad (26)$$

where $U_{B-67}$ is the breakdown voltage of the arrester 67. The step of repeating on said other capacitors 1-1, 2-1 and 30-1 all steps which are realized with said first 1 second 2 and third 30 capacitors is realized by diodes 46-1, 49-1, 50-1 and other resistance voltage divider with the first $R_{1-1}$, the second $R_{2-1}$ and the third $R_{3-1}$ adjustable resistances (FIG. 36a).

The steps of (FIG. 36b): choosing 3n (where n=1, 2, 3, 4, 5 . . . etc) other capacitors or 3n other groups of capacitors; repeating on each 3 of said other capacitors or on each 3 of said other groups of capacitors all steps which are realized with said first 1, second 2 and third 3 capacitors or all steps which are realized with said first, second and third groups of capacitors; connecting said first, second, third and 3n other capacitors or said first, second, third groups of capacitors and said 3n other groups of capacitors in series during discharging of said all capacitors ensure obtaining a voltage $U_L$ on a load 68 about 1+n times more than a voltage $U_L$ of a voltage source 64 of the operating electric circuit with revolutionary broad ranges of changing the capacity $C_A$ of the adjustable capacitor.

$$U_L \approx U_S \times (1+n) \qquad (27)$$

The technical solution (FIG. 36b), in which each 3 of said 3n other capacitors or each 3 of said 3n other groups of capacitors have capacities respectively equal to capacities of said first 1, second 2 and third 30 capacitors or said first, second and third groups of capacitors, is easy to realize.

For the realization shown in FIG. 39 voltages are given by following expressions:

$$U_0(t)=U_1(t)+U_{30}(t) \quad (28)$$

$$U_0(t)=U_{r1}(t)+U_{r2}(t) \quad (29)$$

$$U_{r1}(t)=U_1(t) \quad (30)$$

$$U_{r2}(t)=U_{30}(t), \quad (31)$$

where: $U_0(t)$-is an instantaneous voltage of the operating electric circuit or network; $U_1(t)$ and $U_{30}(t)$ are instantaneous voltages on the first 1 and the third 30 capacitors; $U_{r1}(t)$ and $U_{r2}(t)$ are instantaneous voltages on the first $r_1$, the second $r_2$ adjustable resistances.

For the realization shown in FIG. 39, in case of the phase-shift $\phi$ between voltages $U_0(t)$ and $U_{30}(t)$ is equal to zero (similarly to the phase-shift $\phi$ between voltages shown in FIG. 10a and FIG. 10b) and $r_1=0$, $r_2>0$ [$U_{r2}(t)=U_0(t)$], the capacity $C_A$ of the adjustable capacitor is equal to the capacity of the third capacitor $C_{30}$:

$$C_A=C_{30} \quad (32)$$

In case of $r_2=0$ [$U_{r1}(t)=U_0(t)$], $r_1>0$ and the phase-shift $\phi_1$ between voltages $U_0(t)$ and $U_{r1}(t)$ is equal to zero (similarly to the phase-shift $\phi$ between voltages shown in FIG. 10a and FIG. 10b), the capacity $C_A$ of the adjustable capacitor is equal to the capacity of the first capacitor $C_1$:

$$C_A=C_1 \quad (33)$$

Therefore, by changing values $r_1$ and/or $r_2$ one can change the capacity $C_A$ of the adjustable capacitor within limits:

$$C_1 \leq C_A \leq C_{30}, \quad (34)$$

when $C_{30}>C_1$, or within limits:

$$C_{30} \leq C_A \leq C_1, \quad (35)$$

when $C_1>C_{30}$.

For the realization shown in FIG. 40, in case of $U_a(t)=0$ [where $U_a(t)$ is the control voltage applying to the third capacitor 30 or to output terminals of the third group of capacitors 30], the capacity $C_A$ of the adjustable capacitor is given by following expressions:

$$C_A=(C_1 \times C_{30})/(C_1+C_{30}) \quad (36)$$

In case of $U_a(t)=U_0(t)$ (FIG. 10a and FIG. 10b) the capacity $C_A$ of the adjustable capacitor is equal to zero:

$$C_A=0 \quad (37)$$

Therefore, by changing a value of the voltage, applied to the third capacitor 30 or to output terminals of the third group of capacitors 30 (FIG. 40), in case of the phase-shift $\phi$ between voltages $U_0(t)$ and $U_a(t)$ is equal to zero (FIG. 10a and FIG. 10b), one can change the capacity $C_A$ of the adjustable capacitor.

$L_{op}$ is different for different realizations. For example:

a) In case of $\phi=0$, $U_0>U_a$ (FIG. 42, FIG. 10a and FIG. 10b) and $|q_{30}max|>|q_5max|$, the value of the inductance $L_{op4}$ (L=$L_{op4}$, when S =$S_{min4}$) of the adjustable inductive reactance device 25 or the adjustable reactor 31 ensures the maximum recovery of charges $+\Delta q_4$ and $-\Delta q_4$, where:

$$|\Delta q_4| \approx |q_{30}max| - |q_5max|, \quad (38)$$

$|q_{30}max|$ is a value of maximum charge on the plate of said third capacitor 30 (FIG. 37) or on the plate(s) of said third group of capacitors 30 connected to the first output terminal of the third group of capacitors (FIG. 42), $|q_5max|$ is a value of maximum charge on the plate 5 of said first capacitor 1 (FIG. 37) or on the plate(s) connected to the second output terminal of said first group of capacitors 1 (FIG. 42).

b) In case of $\phi=180°$ (FIG. 37, FIG. 42, FIG. 10a and FIG. 10c), the value of the inductance $L_{op5}$ (L=$L_{op5}$, when S=$S_{min5}$) of the adjustable inductive reactance device 25 or the adjustable reactor 31 ensures the maximum recovery of charges $+q_{30}max$, $-q_{30}max$ and a part of charges $+q_5max$ and $-q_5max$.

For realizations shown in FIG. 43, FIG. 44, FIG. 45 and FIG. 46, after finishing the process of charging the adjustable capacitor 8, voltages and the energy of the adjustable capacitor $W_A$ are given by following expressions:

$$U_0=U_1+U_{30} \quad (39)$$

$$W_A=\tfrac{1}{2} \times C_1 \times (U_0-U_{30})^2 + \tfrac{1}{2} \times C_{30} \times U_{30}^2 \quad (40)$$

$$W_A=\tfrac{1}{2} \times C_A \times U_0^2, \quad (41)$$

where: $U_0$-is the voltage of the operating electric circuit or network; $U_1$ and $U_{30}$ are voltages on the first 1 and the third 30 capacitors. It follows from above expressions (40) and (41) that by changing a value of voltage, applied to the third capacitor 30 or to output terminals of the third group of capacitors, one can change the capacity $C_A$ of the adjustable capacitor within limits:

$$C_1 \leq C_A \leq C_{30}, \quad (42)$$

when $C_{30}>C_1$, or within limits:

$$C_{30} \leq C_A \leq C_1, \quad (43)$$

when $C_1>C_{30}$.

The steps of:

choosing two other capacitors 1-1 and 30-1 (FIG. 47a); repeating on said other capacitors 1-1 and 30-1 all steps which are realized with said first 1 and third 30 capacitors;

connecting the first 1, the third 30 and other capacitors 1-1 and 30-1 in series during discharging of said all capacitors 1, 30, 1-1 and 30-1 ensure obtaining a voltage $U_L$ on a load 68 about two times more than a voltage $U_S$ of a voltage source 64 of the operating electric circuit with revolutionary broad ranges of changing the capacity $C_A$ of the adjustable capacitor.

$$U_L \approx 2U_S \quad (44)$$

The step of connecting the first 1, the third 30 and other capacitors 1-1 and 30-1 in series and the step of discharging all capacitors are realized by switching on the arrester 65 because $$2U_S>U_{B-67} \quad (45)$$

where $U_{B-67}$ is the breakdown voltage of the arrester 67. The step of repeating on said other capacitors 1-1 and 30-1 all steps which are realized with said first 1 and third 30 capacitors is realized by diodes 46-1, 49-1 and other resistance voltage divider with the first $r_{1-1}$, and the second $r_{2-1}$ adjustable resistances (FIG. 47a).

The steps of (FIG. 47b):

choosing 2n (where n=1, 2, 3, 4, 5 ... etc) other capacitors or 2n other groups of capacitors;

repeating on each 2 of said other capacitors or on each 2 of said other groups of capacitors all steps which are realized with said first and third capacitors or all steps which are realized with said first and third groups of capacitors;

connecting said first, third and 2n other capacitors or said first, third groups of capacitors and said 2n other groups of capacitors in series during discharging of said all capacitors ensure obtaining a voltage $U_L$ on a load 68 about 1+n times more than a voltage $U_S$ of a voltage source 64 of the operating electric circuit with revolutionary broad ranges of changing the capacity $C_A$ of the adjustable capacitor.

$$U_L \approx U_S \times (1+n) \qquad (46)$$

The technical solution (FIG. 47*b*), in which each 2 of said 2n other capacitors or each 2 of said 2n other groups of capacitors have capacities respectively equal to capacities of said first 1 and third 30 capacitors or said first and third groups of capacitors, is easy to realize.

Known Marx Generators cannot change capacities of capacitors. Consequently, the steps described above ensure transformation of all types of Marx Generators to new Generators with revolutionary broad ranges of changing capacities of capacitors.

Further modifications of the invention herein disclosed will occur to persons skilled in the art and all such modifications are deemed to be within the spirit and scope of the invention as defined by the appended claims.

What is claimed is:

1. The method of obtaining the adjustable capacitor comprising the steps of:

choosing the capacity of a first capacitor or a first group of capacitors, which has first and second output terminals, equal to the capacity of a second capacitor or a second group of capacitors which has first and second output terminals;

choosing a voltage source whose terminals of opposite polarities are equally insulated with regard to the ground and whose created voltage on said terminals is a voltage of the same type that the voltage of an operating electric circuit or a network;

connecting said operating electric circuit or network through first plates of said first and second capacitors or through said first output terminals of said first and second groups of capacitors;

applying a part of voltage of said operating electric circuit or network or a full voltage of said operating electric circuit or network to second plates of said first and second capacitors or to second output terminals of said first and second groups of capacitors or applying a control voltage to second plates of said first and second capacitors or to second output terminals of said first and second groups of capacitors by said voltage source;

and changing the capacity of the adjustable capacitor by changing a value of said part of voltage of said operating electric circuit or network or a value of said full voltage of said operating electric circuit or network or changing the capacity of the adjustable capacitor by changing a value of said control voltage.

2. The method of obtaining the adjustable capacitor as claimed in claim 1 in which said voltages are voltages of alternating current.

3. The method of obtaining the adjustable capacitor as claimed in claim 2, further comprising the step of changing the capacity of the adjustable capacitor by changing a phase-shift φ between said control voltage and the voltage of said operating electric circuit or network, applied to first plates of said first and second capacitors or to said first output terminals of said first and second groups of capacitors, or by changing a phase-shift φ between said full voltage or the part of voltage of said operating electric circuit or network, applied to second plates of said first and second capacitors or to said second output terminals of said first and second groups of capacitors, and the voltage of said operating electric circuit or network, applied to first plates of said first and second capacitors or to said first output terminals of said first and second groups of capacitors.

4. The method of obtaining the adjustable capacitor as claimed in claim 2, further comprising the step of changing the capacity of the adjustable capacitor by changing the direction of said control voltage or by changing the direction of said part of voltage of the operating electric circuit or network or by changing the direction of said full voltage of said operating electric circuit or network, applied to second plates of said first and second capacitors or to said second output terminals of said first and second groups of capacitors.

5. The method of obtaining the adjustable capacitor as claimed in claim 2, further comprising the step of choosing said control voltage with the phase-shift φ between it and the voltage of said operating electric circuit or network, applied to first plates of said first and second capacitors or to said first output terminals of said first and second groups of capacitors, equal to zero.

6. The method of obtaining the adjustable capacitor as claimed in claim 2, further comprising the step of choosing said control voltage with the phase-shift φ between it and the voltage of said operating electric circuit or network, applied to first plates of said first and second capacitors or to said first output terminals of said first and second groups of capacitors, equal to 180°.

7. The method of obtaining the adjustable capacitor as claimed in claim 2, further comprising the step of choosing the maximum value of said control voltage more than the voltage of said operating electric circuit or network.

8. The method of obtaining the adjustable capacitor as claimed in claim 2, further comprising the step of connecting said second plates of said first and second capacitors or said second output terminals of said first and second groups of capacitors through at least one inductive reactance device or one reactor or through at least one adjustable inductive reactance device or one adjustable reactor.

9. The method of obtaining the adjustable capacitor as claimed in claim 8, further comprising the step of connecting said second plates of said first and second capacitors or said second output terminals of said first and second groups of capacitors through at least a third capacitor or at least a third group of capacitors which has first and second output terminals.

10. The method of obtaining the adjustable capacitor as claimed in claim 9, further comprising the steps of:

changing and registering values of inductances L of said inductive reactance device or said reactor;

measuring, registering or calculating values of total powers S or at least one of their active P and reactive Q components in the circuit of said control voltage or in the circuit of said part of voltage of said operating electric circuit or network or in the circuit of said full voltage of said operating electric circuit or network, which is connected to second plates of said first and second capacitors or which is connected to said second output terminals of said first and second groups of capacitors;

choosing optimum values of inductances $L_{op}$ of the inductive reactance device or the reactor by conditions:

$L=L_{op}$, when $S=S_{min}$, or when $P=P_{min}$, or when $Q=Q_{min}$, where:

$S_{min}$, $P_{min}$ and $Q_{min}$ are respectively values of minimum total, active and reactive powers.

11. The method of obtaining the adjustable capacitor as claimed in claim 10, further comprising the step of interrupting the circuit of said control voltage or interrupting the circuit of said part of voltage of said operating electric circuit or network or interrupting the circuit of said full voltage of said operating electric circuit or network, which is connected to second plates of said first and second capacitors or to second output terminals of said first and second groups of capacitors, within discharging said capacitors.

12. The method of obtaining the adjustable capacitor as claimed in claim 10, further comprising the step of changing the capacity of the adjustable capacitor by transmitting or transforming a part of energy of said capacitors or said inductive reactance device or said reactor in a supplementary electric circuit.

13. The method of obtaining the adjustable capacitor as claimed in claim 10 in which said inductive reactance device or a part of it or said reactor or a part of it is realized as a transformer.

14. The method of obtaining the adjustable capacitor as claimed in claim 10, further comprising the steps of:

connecting second terminals of a first $R_1$ and a second $R_2$ adjustable resistances, which are equal to each other, to first and second terminals of a third adjustable resistance $R_3$ respectively;

choosing the values of a first additional $R_{1A}$, a second additional $R_{2A}$ and a third additional $R_{3A}$ adjustable resistances much bigger than the values of said first $R_1$, second $R_2$ and third $R_3$ adjustable resistances respectively by following expression:

$R_{1A}/R_1=R_{2A}/R_2=R_{3A}/R_3$;

connecting second terminals of said first additional $R_{1A}$ and second additional $R_{2A}$ adjustable resistances, which are equal to each other, to first and second terminals of said third additional adjustable resistance $R_{3A}$ respectively;

connecting different potentials of said operating electric circuit or network through first terminals of said first $R_1$ and second $R_2$ adjustable resistances;

connecting different potentials of said operating electric circuit or network through first terminals of said first additional $R_{1A}$ and second additional $R_{2A}$ adjustable resistances similar to the connection of different potentials of said operating electric circuit or network through first terminals of said first $R_1$ and second $R_2$ adjustable resistances;

connecting second plates of said first and second capacitors or second output terminals of said first and second groups of capacitors through said first and second terminals of said third adjustable resistance $R_3$ respectively;

connecting second plates of said first and second capacitors or second output terminals of said first and second groups of capacitors through said first and second terminals of said third additional adjustable resistance $R_{3A}$ respectively;

disconnecting electrical connections of second plates of said first and second capacitors through said first and second terminals of said third adjustable resistance $R_3$ or disconnecting electrical connections of second output terminals of said first and second groups of capacitors through said first and second terminals of said third adjustable resistance $R_3$;

and changing the capacity of the adjustable capacitor by changing at least one of said additional resistances $R_{1A}$, $R_{2A}$ and $R_{3A}$ or by changing said first $R_{1A}$ and second $R_{2A}$ additional resistances equally.

15. The method of obtaining the adjustable capacitor as claimed in claim 1, further comprising the step of repeating said steps as claimed in claim 1 for each phase A, B and C in case of a three-phase network or a three-phase circuit.

16. The method of obtaining the adjustable capacitor as claimed in claim 1, further comprising the steps of:

measuring or calculating a power factor or a current or a power or a voltage, of said operating electric circuit or network, or their reactive and active components;

receiving signals or values of said measuring or calculating;

and using said signals or values in said step of changing:

the value of said control voltage or the value of said part of voltage of said operating electric circuit or network or the value of said full voltage of said operating electric circuit or network;

or the phase-shift between said control voltage and the voltage of said operating electric circuit or network or the phase-shift between said full voltage or the part of voltage of said operating electric circuit or network, applied to second plates of said first and second capacitors or to said second output terminals of said first and second groups of capacitors, and the voltage of said operating electric circuit or network, applied to first plates of said first and second capacitors or to said first output terminals of said first and second groups of capacitors.

17. The method of obtaining the adjustable capacitor as claimed in claim 1 in which said step of connecting an operating electric circuit or a network through first plates of said first and second capacitors or through said first output terminals of said first and second groups of capacitors is realized through a load or through a bridge rectifier and a load.

18. The method of obtaining the adjustable capacitor as claimed in claim 1 further comprising the step of connecting said second plates of said first and second capacitors or said second output terminals of said first and second groups of capacitors through at least a third capacitor or through first and second output terminals of a third group of capacitors.

19. The method of obtaining the adjustable capacitor as claimed in claim 18, in which said voltages are voltages of direct current, further comprising the step of connecting electrically plates of said third capacitor or connecting electrically said first and second output terminals of said third group of capacitors within discharging of said first and second capacitors or said first and second groups of capacitors.

20. The method of obtaining the adjustable capacitor as claimed in claim 19 in which said step of connecting electrically plates of said third capacitor or said first and second output terminals of said third group of capacitors is realized as a short circuit.

21. The method of obtaining the adjustable capacitor as claimed in claim 19 in which said step of connecting electrically plates of said third capacitor or said first and second output terminals of said third group of capacitors is realized through at least one diode which is installed against current of charging of said third capacitor or of said third group of capacitors.

22. The method of obtaining the adjustable capacitor as claimed in claim 19 in which said step of applying said control voltage or said part of voltage of said operating electric circuit or network or said full voltage of said operating electric circuit or network to second plates of said first and second capacitors or to second output terminals of said first and second groups of capacitors is realized within charging of said capacitors.

23. The method of obtaining the adjustable capacitor as claimed in claim 19, further comprising the steps of:
   detecting the voltage of said third capacitor or said third group of capacitors within its discharging;
   receiving signals of detecting;
   and using said signals in said step of connecting electrically plates of said third capacitor or said first and second output terminals of said third group of capacitors.

24. The method of obtaining the adjustable capacitor as claimed in claim 17, further comprising the steps of:
   choosing 3n (where n=1, 2, 3, 4, 5 ... etc) other capacitors or 3n other groups of capacitors;
   repeating on each 3 of said other capacitors or on each 3 of said other groups of capacitors all steps which are realized with said first, second and third capacitors or all steps which are realized with said first, second and third groups of capacitors; connecting said first, second, third and 3n other capacitors or said first, second, third groups of capacitors and said 3n other groups of capacitors in series during discharging of said all capacitors.

25. The method of obtaining the adjustable capacitor as claimed in claim 24 in which each 3 of said 3n other capacitors or each 3 of said 3n other groups of capacitors have capacities respectively equal to capacities of said first, second and third capacitors or said first, second and third groups of capacitors.

26. The method of obtaining the adjustable capacitor as claimed in claim 25 in which said step of applying a part of voltage of said operating electric circuit or network or a full voltage of said operating electric circuit or network to second plates of said first and second capacitors or to second output terminals of said first and second groups of capacitors and said step of changing the capacity of the adjustable capacitor are realized by the steps of:
   choosing a first and a second branches, which can change their reactances or resistances or states, equal to each other or choosing a first $R_1$ and a second $R_2$ adjustable resistances equal to each other or choosing a voltage divider having a first, a second arms, equal to each other, which can change their reactances or resistances or states, and including a third arm, which can change its reactance or resistance or state, each of said arms having first and second terminals, first and second terminals of said third arm are connected to second terminal of said first arm and to second terminal of said second arm respectively;
   connecting first and second terminals of a third branch, which can change its reactance or resistance or state, to second terminals of said first and second branches respectively or connecting first and second terminals of a third $R_3$ adjustable resistance to second terminals of said first $R_1$ and second $R_2$ adjustable resistances respectively;
   connecting different potentials of said operating electric circuit or network through first terminals of said first and second branches or through first terminals of said first $R_1$ and second $R_2$ adjustable resistances or connecting different potentials of said operating electric circuit or network through said first terminals of said first and second arms;
   connecting second plates of said first and second capacitors or second output terminals of said first and second groups of capacitors through said first and second terminals of said third branch respectively or through said first and second terminals of said third resistance $R_3$ respectively or through said first and second terminals of said third arm respectively;
   changing reactance or resistance or state of at least one of said branches or changing at least one of said resistances $R_1$, $R_2$ and $R_3$ or changing reactance or resistance or state of at least one of said arms or changing reactances or resistances or states of said first and second branches equally or changing said first $R_1$ and second $R_2$ resistances equally or changing reactances or resistances or states of said first and second arms equally.

27. The method of obtaining the adjustable capacitor as claimed in claim 18, in which said voltages are voltages of direct current, further comprising the step of connecting electrically plates of said first capacitor and plates of said second capacitor or connecting electrically said first and second output terminals of said first group of capacitors and said first and second output terminals of said second group of capacitors within discharging of said third capacitor or said third group of capacitors.

28. The method of obtaining the adjustable capacitor as claimed in claim 27 in which said step of connecting electrically plates of said first capacitor and plates of said second capacitor or connecting electrically said first and second output terminals of said first group of capacitors and said first and second output terminals of said second group of capacitors is realized as short circuits.

29. The method of obtaining the adjustable capacitor as claimed in claim 27 in which said step of connecting electrically plates of said first capacitor and plates of said second capacitor or connecting electrically said first and second output terminals of said first group of capacitors and said first and second output terminals of said second group of capacitors is realized through at least two additional diodes which are installed against current of charging of said first and second capacitors or of said first and second groups of capacitors.

30. The method of obtaining the adjustable capacitor as claimed in claim 27, further comprising the steps of:
   detecting the voltage of at least one of said first and second capacitors or the voltage on output terminals of at least one of said first and second groups of capacitors within discharging;
   receiving signals of detecting;
   and using said signals in said step of connecting electrically plates of said first and second capacitors or said first and second output terminals of said first and second groups of capacitors.

31. The method of obtaining the adjustable capacitor as claimed in claim 27, further comprising the steps of:
   choosing 3n (where n=1, 2, 3, 4, 5 ... etc) other capacitors or 3n other groups of capacitors;
   repeating on each 3 of said other capacitors or on each 3 of said other groups of capacitors all steps which are realized with said first, second and third capacitors or all steps which are realized with said first, second and third groups of capacitors;

connecting said first, second, third and 3n other capacitors or said first, second, third groups of capacitors and said 3n other groups of capacitors in series during discharging of said all capacitors.

32. The method of obtaining the adjustable capacitor comprising the steps of:
connecting at least a first and a third capacitors or a first group of capacitors, having two output terminals, and a third group of capacitors, having two output terminals, in series;
choosing a voltage source whose created voltage is a voltage of the same type that a voltage of an operating electric circuit or a network;
connecting said operating electric circuit or network through said serially connected capacitors or said serially connected groups of capacitors;
applying a part of voltage of said operating electric circuit or network or a full voltage of said operating electric circuit or network to plates of said third capacitor or to first and second output terminals of said third group of capacitors or applying a control voltage to plates of said third capacitor or to first and second output terminals of said third group of capacitors by said voltage source;
and changing the capacity of the adjustable capacitor by changing a value of said part of voltage of said operating electric circuit or network or a value of said full voltage of said operating electric circuit or network or changing the capacity of the adjustable capacitor by changing a value of said control voltage.

33. The method of obtaining the adjustable capacitor as claimed in claim 32, further comprising the step of changing the capacity of the adjustable capacitor by changing the direction of said control voltage or by changing the direction of said part of voltage of the operating electric circuit or network or by changing the direction of said full voltage of said operating electric circuit or network, applied to said third capacitor or to first and second output terminals of said third group of capacitors.

34. The method of obtaining the adjustable capacitor as claimed in claim 32, further comprising the step of connecting plates of said third capacitor or first and second output terminals of said third group of capacitors through at least one inductive reactance device or one reactor or through at least one adjustable inductive reactance device or one adjustable reactor.

35. The method of obtaining the adjustable capacitor as claimed in claim 34 further comprising the step of choosing the maximum value of said control voltage more than the voltage of said operating electric circuit or network.

36. The method of obtaining the adjustable capacitor as claimed in claim 32, in which said voltages are voltages of direct current, further comprising the step of connecting electrically plates of said third capacitor or said first and second output terminals of said third group of capacitors within discharging of said first capacitor or said first group of capacitors.

37. The method of obtaining the adjustable capacitor as claimed in claim 36 in which said step of connecting electrically plates of said third capacitor or said first and second output terminals of said third group of capacitors is realized through at least one diode which is installed against current of charging of said third capacitor or said third group of capacitors.

38. The method of obtaining the adjustable capacitor as claimed in claim 36, further comprising the steps of:
choosing 2n (where n=1, 2, 3, 4, 5 . . . etc) other capacitors or 2n other groups of capacitors;
repeating on each 2 of said other capacitors or on each 2 of said other groups of capacitors all steps which are realized with said first and third capacitors or all steps which are realized with said first and third groups of capacitors;
connecting said first, third and 2n other capacitors or said first, third groups of capacitors and said 2n other groups of capacitors in series during discharging of said all capacitors.

39. The method of obtaining the adjustable capacitor as claimed in claim 38 in which each 2 of said 2n other capacitors or each 2 of said 2n other groups of capacitors have capacities respectively equal to capacities of said first and third capacitors or said first and third groups of capacitors.

40. The method of obtaining the adjustable capacitor as claimed in claim 39 in which said step of changing the capacity of the adjustable capacitor is realized by:
a voltage divider having serially connected a first and a second arms, which can change their reactances or resistances or states, each of said arms having the second output terminal connecting said arms to each other and the first output terminal or by a resistance voltage divider with serially connected a first $r_1$ and a second $r_2$ adjustable resistances, where different potentials of said operating electric circuit or network are connected through first output terminals of said arms or through said resistance voltage divider, plates of said first and third capacitors or first and second output terminals of said first and third group of capacitors are connected through one and other of said arms respectively or through one and other of said adjustable resistances respectively;
and by step of changing reactance or resistance or state of at least one of said arms or by step of changing of at least a value of one of said adjustable resistances.

41. The method of obtaining the adjustable capacitor as claimed in claim 32, in which said voltages are voltages of direct current, further comprising the step of connecting electrically plates of said first capacitor or said first and second output terminals of said first group of capacitors within discharging of said third capacitor or said third group of capacitors.

42. The method of obtaining the adjustable capacitor as claimed in claim 41 in which said step of connecting electrically plates of said first capacitor or connecting electrically said first and second output terminals of said first group of capacitors is realized through at least an additional diode which is installed against current of charging said first capacitor or said first group of capacitors.

43. The method of obtaining the adjustable capacitor as claimed in claim 41, further comprising the steps of:
choosing 2n (where n=1, 2, 3, 4, 5 . . . etc) other capacitors or 2n other groups of capacitors;
repeating on each 2 of said other capacitors or on each 2 of said other groups of capacitors all steps which are realized with said first and third capacitors or all steps which are realized with said first and third groups of capacitors;
connecting said first, third and 2n other capacitors or said first, third groups of capacitors and said 2n other groups of capacitors in series during discharging of said all capacitors.

* * * * *

UNITED STATES PATENT AND TRADEMARK OFFICE
CERTIFICATE OF CORRECTION

PATENT NO. : 6,078,110
DATED : June 20, 2000
INVENTOR(S) : Manvel Zakharian

It is certified that error appears in the above-identified patent and that said Letters Patent is hereby corrected as shown below:

Column 35,
Line 2, delete "claim 17" and insert -- claim 19 --.

Column 37,
Line 40, delete "claim 34" and insert -- claims 32, 33 or 34 --.

Claims 27, 28, 29, 30, 31, 26, 41, 42, 43, and 40, and the dependency of renumbered claims, should be as follows:

| Claim | Renumbered as: | Dependency of renumbered claims corrected to read: |
|---|---|---|
| 27 | 26 | |
| 28 | 27 | 26 |
| 29 | 28 | 26 |
| 30 | 29 | 26 |
| 31 | 30 | 16 |
| 26 | 31 | 1, 2, 3, 4, 8, 9, 10, 11, 12, 13, 15, 16, 17, 18, 19, 20, 21, 22, 23, 24, 25, 26, 27, 28, 29, or 30 |
| 41 | 40 | |
| 42 | 41 | 40 |
| 43 | 42 | 40 |
| 40 | 43 | 32, 33, 34, 36, 37, 38, 39, 40, 41, or 42 |

Signed and Sealed this

Ninth Day of July, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,078,110  Page 1 of 1
DATED : June 20, 2000
INVENTOR(S) : Manvel Zakharian It is certified that error appears in the above-identified patent and that said Letters Patent is hereby corrected as shown below:

Column 35,
Line 20, delete "claim 17" and insert -- claim 19 --.

Column 37,
Line 47, delete "claim 34" and insert -- claims 32, 33 or 34 --.

Claims 27, 28, 29, 30, 31, 26, 41, 42, 43, and 40, and the dependency of renumbered claims, should be as follows:

| Claim | Renumbered as: | Dependency of renumbered claims corrected to read: |
|---|---|---|
| 27 | 26 | |
| 28 | 27 | 26 |
| 29 | 28 | 26 |
| 30 | 29 | 26 |
| 31 | 30 | 16 |
| 26 | 31 | 1, 2, 3, 4, 8, 9, 10, 11, 12, 13, 15, 16, 17, 18, 19, 20, 21, 22, 23, 24, 25, 26, 27, 28, 29, or 30 |
| 41 | 40 | |
| 42 | 41 | 40 |
| 43 | 42 | 40 |
| 40 | 43 | 32, 33, 34, 36, 37, 38, 39, 40, 41, or 42 |

This certificate supersedes Certificate of Correction issued July 9, 2002

Signed and Sealed this

Seventeenth Day of September, 2002

*Attest:*

*Attesting Officer*

JAMES E. ROGAN
*Director of the United States Patent and Trademark Office*